(12) United States Patent
Verberkt et al.

(10) Patent No.: US 11,843,609 B2
(45) Date of Patent: Dec. 12, 2023

(54) COMPUTING CLOUD FOR MONITORING PHYSICAL ENVIRONMENTS

(71) Applicant: SIGNIFY HOLDING B.V., Eindhoven (NL)

(72) Inventors: Mark Henricus Verberkt, Eindhoven (NL); Seth Van Roemburg, Eindhoven (NL); Marcin Gramza, Eindhoven (NL); Marcin Klecha, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 786 days.

(21) Appl. No.: 16/094,283

(22) PCT Filed: Apr. 12, 2017

(86) PCT No.: PCT/EP2017/058765
§ 371 (c)(1),
(2) Date: Oct. 17, 2018

(87) PCT Pub. No.: WO2017/182357
PCT Pub. Date: Oct. 26, 2017

(65) Prior Publication Data
US 2019/0132329 A1   May 2, 2019

(30) Foreign Application Priority Data

Apr. 7, 2017   (EP) .................................... 17165388

(51) Int. Cl.
*H04L 29/06* (2006.01)
*G06F 21/62* (2013.01)
(Continued)

(52) U.S. Cl.
CPC ........ *H04L 63/105* (2013.01); *G06F 21/6218* (2013.01); *G06Q 10/06* (2013.01); *H04L 63/029* (2013.01); *H04L 67/306* (2013.01)

(58) Field of Classification Search
CPC ..... H04L 29/06; H04L 29/08; H04L 63/0815; H04L 63/20; H04L 63/10; G06F 21/62; G06F 21/6218
See application file for complete search history.

(56) References Cited

U.S. PATENT DOCUMENTS 10,397,013 B1 * 8/2019 Hill ........................ H04L 12/281
2006/0025891 A1   2/2006 Budike, Jr.
(Continued)

FOREIGN PATENT DOCUMENTS

EP        3723012 A1 * 10/2020   ............. G06Q 10/06
JP     2002312455 A    10/2002
(Continued)

*Primary Examiner* — Phy Anh T Vu

(57) ABSTRACT

Disclosed is a computing cloud for monitoring physical environments. The computing cloud comprises at least one data storage unit that is configured to store project data, diagnostic data or environmental metric data. The computing cloud also comprises a system project application module that is configured to allow a user to graphically explore at least the project data, and to control graphical access to one or more application modules based on a user's credentials. The one or more application modules comprise a module that is configured to graphically facilitate the user's creation and manipulation of a virtual model of a physical environment.

17 Claims, 20 Drawing Sheets

(51) Int. Cl.
  *H04L 9/40* (2022.01)
  *G06Q 10/06* (2023.01)
  *H04L 67/306* (2022.01)

(56) References Cited

U.S. PATENT DOCUMENTS

| | | | |
|---|---|---|---|
| 2009/0105995 A1* | 4/2009 | Harrington | G06Q 10/06 |
| | | | 703/1 |
| 2009/0228926 A1* | 9/2009 | Van De Sluis | H04N 21/4858 |
| | | | 725/39 |
| 2010/0106262 A1* | 4/2010 | Schreyer | H04L 12/2814 |
| | | | 700/86 |
| 2013/0049605 A1 | 2/2013 | Weaver | |
| 2015/0088982 A1* | 3/2015 | Johnson | H04L 67/125 |
| | | | 709/203 |
| 2015/0123563 A1 | 5/2015 | Dahlen | |
| 2015/0278373 A1* | 10/2015 | Roach | H04L 63/104 |
| | | | 707/706 |
| 2016/0087933 A1* | 3/2016 | Johnson | H04L 41/08 |
| | | | 709/245 |
| 2016/0091217 A1 | 3/2016 | Verberkt et al. | |
| 2016/0095189 A1* | 3/2016 | Vangeel | F24F 11/30 |
| | | | 315/152 |
| 2016/0164731 A1* | 6/2016 | Jou | G06F 3/04842 |
| | | | 726/4 |
| 2016/0360594 A1* | 12/2016 | Chemel | H05B 45/20 |
| 2017/0093915 A1* | 3/2017 | Ellis | H04L 63/20 |
| 2019/0097835 A1* | 3/2019 | Bhat | G06F 9/454 |
| 2019/0132316 A1* | 5/2019 | Gramza | H04L 63/0428 |

FOREIGN PATENT DOCUMENTS

| | | |
|---|---|---|
| JP | 2004265774 A | 9/2004 |
| JP | 2005259431 A | 9/2005 |
| JP | 2008533796 A | 8/2008 |
| JP | 2011175758 A | 9/2011 |
| JP | 2012048909 A | 3/2012 |
| JP | 2014532275 A | 12/2014 |
| JP | 2015026615 A | 2/2015 |
| JP | 2015032445 A | 2/2015 |
| JP | 2015504520 A | 2/2015 |
| WO | 2015054611 A1 | 4/2015 |
| WO | 2016050571 A1 | 4/2016 |

* cited by examiner

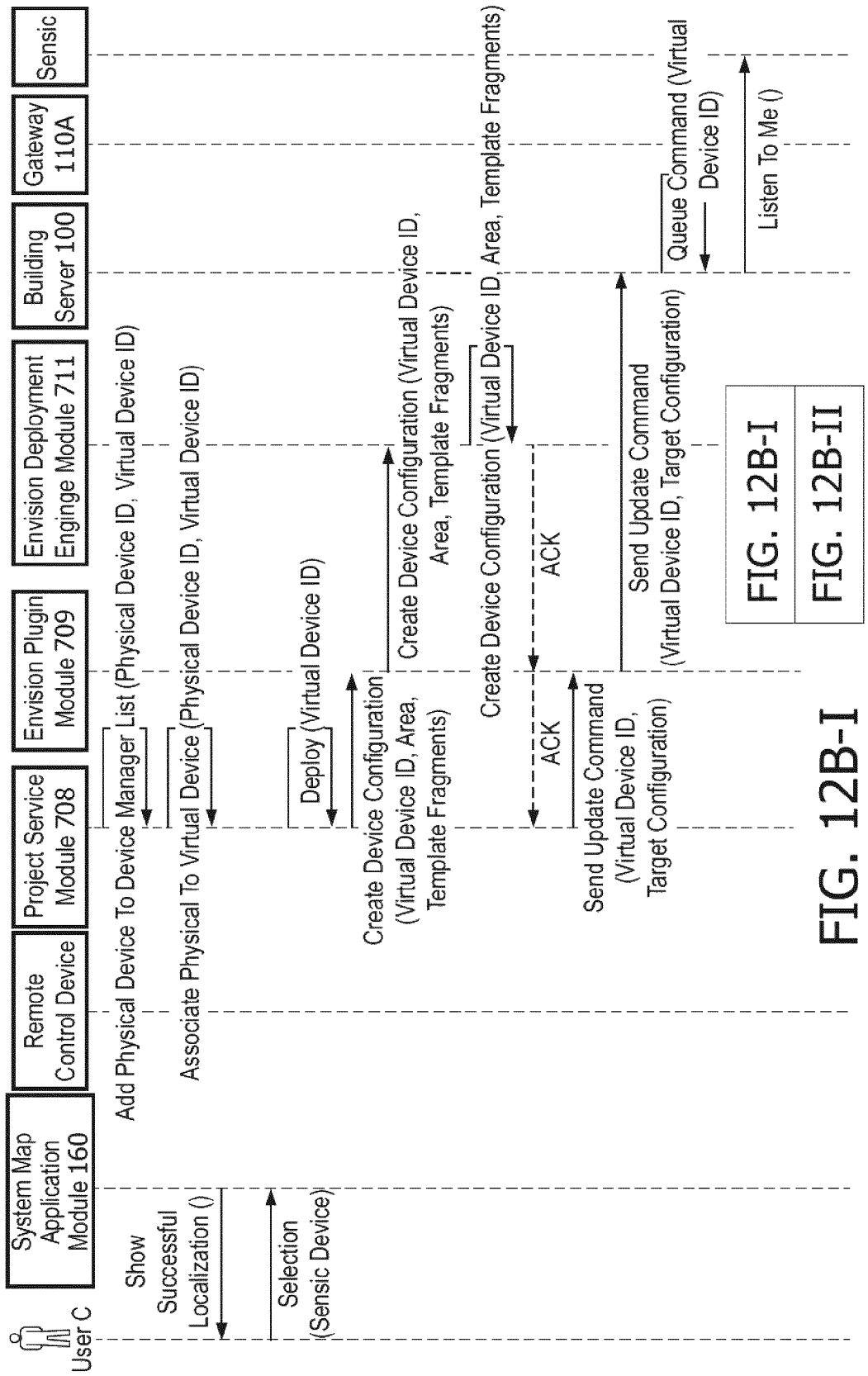
FIG. 12B-I

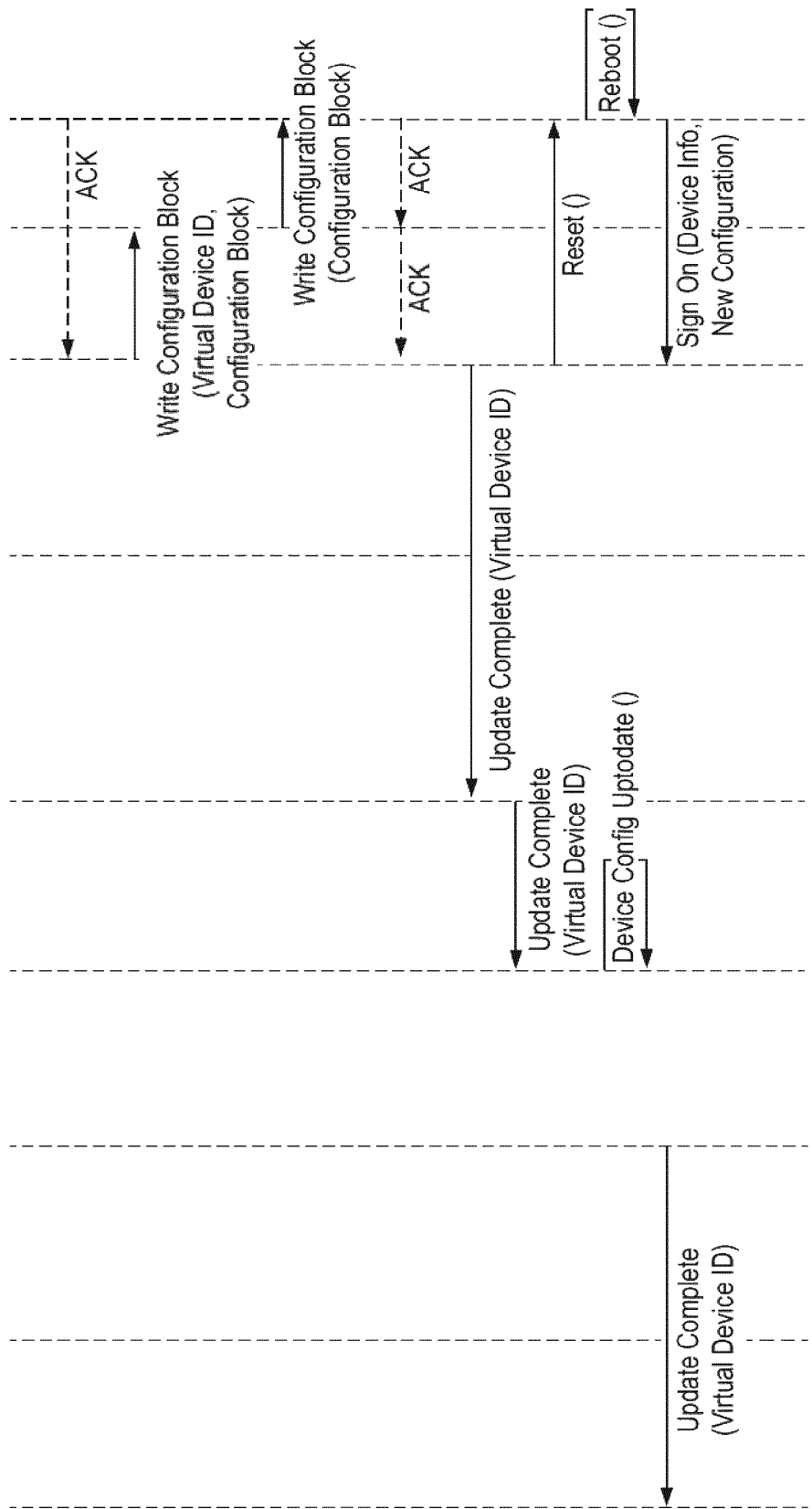
FIG. 12B-II

COMPUTING CLOUD FOR MONITORING PHYSICAL ENVIRONMENTS

CROSS-REFERENCE TO PRIOR APPLICATIONS

This application is the U.S. National Phase application under 35 U.S.C. § 371 of International Application No. PCT/EP2017/058765, filed on Apr. 12, 2017, which claims the benefit of Indian Patent Application No. 201641013925, filed on Apr. 21, 2016, International Application No. PCT/EP2017/054317, filed on Feb. 24, 2017, and European Application No. 17165388.4, filed on Apr. 7, 2017. These applications are hereby incorporated by reference herein.

TECHNICAL FIELD

The present invention is directed generally to the cloud-based monitoring and control of physical environments, such as indoor or outdoor spaces. More particularly, various inventive systems, methods and apparatuses disclosed herein relate to seamlessly deploying cloud-based space usage monitoring systems, indirectly and directly measuring power consumption, and using cloud-based analytics to mine the gathered data for key insights on energy consumption and management.

BACKGROUND

The monitoring of indoor environments as well as resources (e.g. the use of appliances) has recently gained importance as energy efficiency has become crucial to cost savings, and technological advances in a variety of areas of endeavor have made it possible to gather and process relevant data in real time. However, despite these technological advances, which we describe in some detail below, there are a host of hurdles (e.g. issues of data privacy and scalability) that have not yet been sufficiently addressed by the state of the art.

For a variety of reasons, indoor as well as outdoor lighting is presently moving away from traditional fluorescent, HID, and incandescent lamps, and towards digital lighting technologies incorporating semiconductor light sources (e.g. light-emitting diodes (LEDs)). LED lighting offers, among other benefits, the advantages of controllability, high energy conversion and optical efficiency, durability, and significantly lower operating costs. Additionally, more recent advances in controllable LED technology has resulted in a variety of efficient and robust full-spectrum lighting sources that can be easily controlled to create various lighting effects and scenes for use in theatrical, office or home settings.

As in lighting technologies, rapid developments have been made in the area of sensor technologies as well. As a result of these improvements, sensors are becoming smaller, cheaper and therefore more ubiquitous. As they now fit into various everyday devices (e.g. light source housings, cameras, and various other small appliances), they are not only being used to continuously measure and monitor simpler environmental metrics (e.g. natural illumination, noise, occupancy, temperature, humidity) but also more complex metrics such as resource and space usage, activity levels, intrusion, and mood, which may require the coordinated use of a various of sensor types.

Further, the intersections of innovation in the realms of wireless communications, smart mobile devices, and cloud computing have created even more possibilities for smart environments. With a new generation of computing devices with unparalleled mobility and computational power, connected appliances (e.g. Internet of Things), access to ubiquitous connected sensors, and the processing and analytic power of cloud-based services, we are now able to gather and process data from both our immediate and remote environments in near real time. As more devices are able to not only connect to a public or private network (e.g. the Internet), but also to connect and communicate with each other, there has been a proliferation of data regarding our physical environment. We now know when devices have broken or are close to reaching their end of life, as well as a host of information about the environmental conditions surrounding these devices owing to the proliferation and integration of sensors within many types of devices. As such data is generated round the clock, there is the ever increasing need to analyze it in a timely and meaningful way such that unfavorable conditions may be rectified or disaster avoided. However, as discussed below, there are many pitfalls that need to be avoided in the quest to monitor and manipulate conditions within these smart physical spaces.

As sensors gather data from all corners of a physical building, including rooms associated with private persons or groups of people, the data gathered may be sensitive image data or data from smart phones or tablets capable of identifying individuals and the activities they are engaged in. The gathering and processing of such data gives rise to issues of data privacy, which may become central to the proper functioning of a system for monitoring physical spaces. How such data needs to be anonymized and/or aggregated, who gets to view the raw or analyzed data, how the data is presented to avoid identifying particular individuals, how the data is securely transmitted from its source (e.g. sensors that gather the raw data) to its destination (e.g. a cloud-based server or an app on an individual's smart phone) needs to be carefully considered and implemented. Existing systems for monitoring space and resource usage have not developed comprehensive strategies to address such issues.

Additionally, space and resource usage data gathered from physical spaces needs to be accurately time-stamped, gathered with sufficient granularity, and processed in a timely manner in order to provide insights that may result in energy or other usage efficiencies. For example, occupancy data that isn't appropriately time-stamped may not provide accurate information regarding when spaces such as meeting rooms or corridors are heavily used. And delays in providing this data to an appropriate cloud server for analysis may, for example, lead to the failure to timely schedule maintenance in high traffic areas or positively affect the scheduling of such spaces in the near future (e.g. by suggesting alternative corridors to direct flow of traffic). Again, existing systems for monitoring space and resource usage have not developed comprehensive strategies to address such issues.

In order to adequately manage the energy and/or space usage at a large site, such as a building that serves as the headquarters of a large corporation, a large number (and variety) of sensor devices would typically be required to perform the basic data generation. Moreover, such facilities typically have a wide variety of appliances (e.g. printers, scanners, lighting devices), and monitoring their usage would also provide useful information regarding energy efficiency. While these devices may all be able to connect to a network such as a local area network, the data they generate will likely be in a variety of formats. Accordingly, any system that is to use the information generated by all the devices present needs to be able to convert between the formats of data coming from these devices to one or more common formats that can be understood and processed by various data processing applications used by the system. At the same time, such building-wide systems need to make it easy for a variety of devices to interface with each other and with the system (e.g. by exposing APIs that makes it easy to add support for new communications protocols or new types of devices). And even as such building or site-wide systems for monitoring spaces and resources grow in their functional complexity, installing and upgrading individual components within such systems need to be relatively seamless, without the need for the involvement of highly skilled installers every step of the way.

Moreover such systems need to have the capability to incorporate new devices without overwhelming any portion of the system. In other words, such systems need to be scalable in that they should be able to comfortably accommodate a growing number of devices and users, and consequently a growing amount of data generated, from a network bandwidth, installation efficiency, and data analysis standpoint. And lastly such complex systems need to be able to manage errors without significant data loss. In other words, they need to anticipate and minimize loss of data when hardware or software fails.

No existing system for monitoring and controlling physical environments provides solutions to at least the aforementioned challenges. The systems, methods and apparatuses presented below provide solutions designed to address these and other challenges.

SUMMARY

Various embodiments are directed herein to systems and methods for cloud-based monitoring and control of physical environments, in order to address the problems set forth in the previous section. This section presents a simplified summary of some of these methods and systems in order to provide a basic understanding of various system components, the interaction between such components, and the various steps involved in various embodiments. This summary is not intended as an exhaustive overview of all inventive embodiments. The system components and method steps described in this section are not necessarily critical components or steps. The purpose of this summary section is to present an overview of various concepts in a more simplified form, as an introduction to the detailed description that follows.

Various embodiments disclose a computing cloud for monitoring and controlling physical environments. The computing comprises one or more data storage units configured to store at least one of project data, diagnostic data and environmental metric data. In many aspects, the computing cloud also comprises a system project application module configured to allow a user to graphically explore at least project data comprising at least one project hierarchy, and to control graphical access to one or more application modules based on at least the user's credentials. The application modules comprise, in various aspects one or more of: a system intake application module configured to graphically facilitate the user's creation and manipulation of a virtual model of a building associated with the at least one project hierarchy; a system map application module configured to enable the user to commission, localize and/or deploy one or more system devices; and a system energy application module configured to graphically depict data produced by a data analytics module, the analysis being conducted using at least one of the diagnostic data and the environmental metric data.

According to various aspects, the computing cloud further comprises a user management application module configured to create user accounts for at least the user, and to assign one or more credentials to the user accounts, the credentials comprising at least a role and login information. In some aspects, the computing cloud also comprises a system login application module configured to receive the credentials associated with a user account, and based on the credentials, control access to the system project application module. In some other aspects, the computing cloud also comprises a system operations application module configured to remotely manage indications of system errors, the system errors comprising one or more of: errors in system device operation, errors in environmental metric data collection or analysis, and errors in commissioning, localization or deployment.

According to various embodiments, the commissioning comprises associating, via a gateway and a building server, a system device's unique identification information with its location on a virtual model of a physical space, the physical space comprising the floor of a building. In some embodiments, localization comprises adding the system device, based on its unique identification information comprising a physical device ID, to a set of devices being managed by the computing cloud, and associating the physical device ID of the system device with a virtual device ID associated with a virtual representation of the system device in a memory. In some other embodiments deployment comprises applying configuration data to system devices, the configuration data being used to prescribe the behavior of the system devices in response to events comprising changes in ambient lighting, changes in occupancy, or passage of time. In various aspects, allowing a user to graphically explore at least project data comprises: restricting the user's access to one or more parts of a project hierarchy associated with the project data, the restricting being based on the system project application module interacting with a system users application module. And the system users application module is configured to manage a user's access rights to project data based at least on the user's credentials.

In some embodiments, the manipulation of the virtual model comprises one or more of: graphically associating floorplan data with a physical or virtual floor, graphically associating one or more regions within a physical or virtual floor with one or more types of functional spaces, graphically depicting system devices at one or more locations of a floor, and associating configuration data with one or more regions of a floor or one or more system devices. In such embodiments and some other embodiments, the login information of a user account comprises a username and a password, the system project application module allows the user to graphically explore at least project data based at least on the user's credentials, and the system project application module controlling graphical access to one or more application modules is based at least on the user's role.

In various aspects, the system project application module allows the user to to graphically explore at least project data comprising at least one project hierarchy in a hierarchical manner. In such embodiments, the exploration begins at a high level in the project hierarchy comprising one or more sites, and proceeds, based on the user's credentials, to lower levels in the hierarchy comprising one or more buildings within a site, one or more floors within a building, and one or more areas within a floor.

In some aspects, the environmental metric data comprises data indicating usage of one or more system devices, the system devices comprising gateways, sensic devices, and building servers, and the diagnostic data comprises data indicative of the functioning of one or more system devices. In such or other aspects, the at least one project hierarchy is associated with at least one site, the at least one site is associated with at least one building, the at least one building is associated at least one floor, the at least one floor is associated with at least one system device. In various embodiments, a building being monitored or controlled by the computing cloud comprises any natural or constructed physical structure, and the role is task-based and comprises the roles of: operational personnel, intake engineer, installer, commissioner, facilities personnel, finance personnel, sustainability personnel, and end user.

Other embodiments may include a non-transitory computer readable storage medium storing instructions executable by a processor to perform a method such as one or more of the methods described herein. Yet other embodiments may include a system including a memory and one or more processors operable to execute instructions, stored in the memory, to perform a method such as one or more of the methods described herein.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semiconductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above). A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The terms "lighting fixture" and "luminaire" are used interchangeably herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network. As used herein, the phrase communicatively coupled refers to two devices or other entities that are able to communicate with each other, either directly or indirectly, via intermediary entities (e.g. other devices or a network). To be communicatively coupled, the two or more devices do not need to have a dedicated connection. They should simply be able to send and/or receive data from each other as necessary.

The term "user" as user herein refers to any entity, human or artificial, that interacts with systems and methods described herein. For example, the term includes, without limitation, occupants of a space such as an office worker or visitor, remote users of a space, a facility manager, a commissioning engineer, a building IT manager, a service engineer, and an installer.

The term "module" or "application module" is used frequently to describe components herein. These terms are directed to software or firmware components, or a combination thereof. A single software/firmware module may be composed of one or more modules. A wholly software module may be executed on one or more processors that each reside on one or more devices. One or more components of the same module (e.g. a frontend) may be executed on or otherwise displayed on one device, which may be remote from another device executing or displaying other components of the same module. A single software module may contain one or more routines or functions. A software module may expose API usable by other modules. The terms are used to depict both computer code that is not being executed and executing code (e.g. a "runtime" module).

The term "System device" is used throughout this specification. In various instances, it may mean devices such as a Gateway (wireless or otherwise) or a Building Server. It also applies to other devices used in physical environments such as sensors, lighting devices (e.g. luminaires, individual light sources), HVAC devices (e.g. heating devices, humidifiers, air conditioners), appliances (e.g. smart boards, fridges, cleaning appliances, dish washers, clothes washers/dryers, televisions), computing/communication devices (e.g. routers, smart phones, tablet computers), and various other sensic or lumic devices.

In many of the Figures described in this specification, labeled arrows are used to depict communications between modules (e.g. module—module communication), devices (e.g. device—device communication), or some combination thereof (e.g. device—module communication). The module—module communication may be, for example, between a system application module in the cloud and a module in a building server or a module in a building server and another in a wireless gateway. Depending upon the type of communication the arrow represents, the communication may involve function calls or other inter-process communication mechanisms. Such communications may be conducted directly by one module or device issuing a command or other signal to invoke an action or response from a module or device directly (e.g. by invoking API for a module that results in causing the module to perform an act, such as updating a database). Such communications may also be conducted indirectly or asynchronously, such as one module updating a queue or other memory, which another module accesses at some later point in time, resulting in action by the second module using the updated information. Various communication protocols (e.g. HTTPS and MQTT) may be used to communicate or exchange information between various modules and devices. For example, HTTPS is sometimes referred to as the communication protocol between, for example, a module in the Building Server and another module in the Gateway, or a Building Server and a Cloud. However, the use of HTTP and MQTT for purposes of illustrating the exchange of data should not be considered limiting, and other communication protocols and techniques may be applied as well.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 12A, 12B-I, 12B-II illustrate embodiments of a method of localizing a System Device such as a Sensic Device at an exemplary cloud-based system for monitoring and controlling physical environments.

DETAILED DESCRIPTION

Reference is now made in detail to illustrative embodiments of the invention, examples of which are shown in the accompanying drawings.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known systems, apparatuses and methods may be omitted so as to not obscure the description of the representative embodiments. Such systems, methods and apparatuses are clearly within the scope of the present teachings.

Embodiments Illustrating Features of the Overall System Architecture

Figure 1:
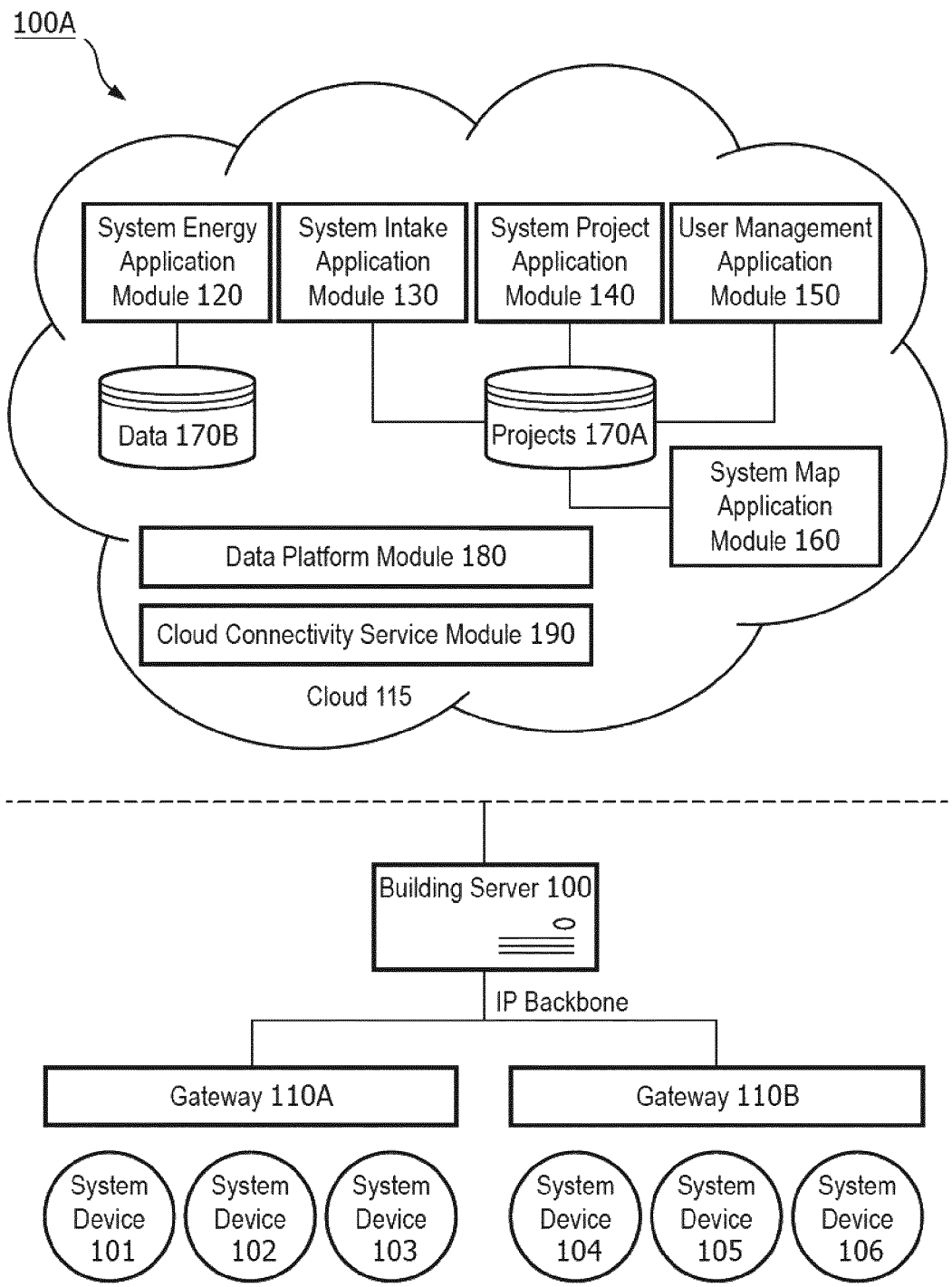
FIG. 1 illustrates a block diagram of an embodiment of a system for cloud-based monitoring and control of physical environments, the embodiment comprising several cloud-based modules and several modules and devices located within the environment being monitored.

FIG. 1 illustrates a system 100A for cloud-based monitoring and control of a physical environment. The system includes a Building Server 100, Gateways 110A and 110B, System devices 101 through 106, a Computing cloud 115, System Energy Application Module 120, System Intake Application Module 130, System Project Application Module 140, User Management Application Module 150, System Map Application Module 160, a Projects Database 170A, a Data Database 170B, a Data Platform Module 180, and a Cloud Connectivity Module 190. Other embodiments of system 100A may include additional or fewer Building Servers, Gateways, System devices, Clouds, Database Modules, Cloud Connectivity Modules, and Data Platforms. Various components of system 100A are communicatively linked using the linkage lines depicted in FIG. 1. However, the lack of a linkage line between two blocks or modules in the figure does not necessarily indicate the lack of communication capability between the blocks or modules. The term "physical structure" or "physical environment" as used herein refers to any building structure, whether or not freestanding, permanent, enclosed, or covered. This term includes for example, office, residential, recreational, educational, governmental, and commercial buildings and complexes, as well as parking lots and garages. The term "link" as used herein refers to any connection or component, whether physical or virtual, that enables the communication of information between at least two devices or system components. For example, a link includes a wired or wireless communications connection, a radio frequency communications connection, and an optical communications connection. A link may also indicate a shared communication protocol, software or hardware interface, or remote method invocation or procedure calls.

Cloud 115 is a typical cloud used for cloud computing. It provides shared data and processing resources to various devices that have access to it. It enables on demand access to a shared pool of computing resources such as networks, servers, storage, applications and services. Cloud 115 supports various cloud-based applications for System 100A, including System Energy Application Module 120, System Intake Application Module 130, System Project Application Module 140, User Management Application Module 150, System Map Application Module 160. These applications and the cloud infrastructure provide two key aspects of System 100A. First, an Installer who is responsible for installing a system like System 100A in a particular building or group of buildings does not need specialized training. Second, the desired behavior of system devices and resources in the physical environment being monitored and controlled is stored in the cloud itself, and is therefore easily configurable and downloadable.

System Energy Application Module 120 is a cloud-based software application that may be used by lay end users of System 100A or by special Expert users of System 100A (e.g. facilities managers) to review reports or perform various tasks related to energy management. For example, a facilities manager may wish to check the average daily consumption in a particular week in order to determine whether a particular Monday had significantly higher energy consumption as compared to the average Monday, or to review data on the monthly energy consumption in the past year in order to determine seasonal changes in energy usage. System Energy Application Module 120 is therefore capable of presenting user interfaces to its users for the purpose of gathering information on what types of information the user would like to see presented, as well as for the purpose of presenting the necessary information in graphical (e.g. bar graphs, heat maps) or raw form, which may be interactive in nature. It may perform analysis using energy consumption data stored in the Data database 170B, either by itself or by using analytics modules within or external to Cloud 115. System Energy Application Module 120 is discussed in more detail in the description associated with FIG. 6.

System Intake Application Module 130 is a cloud-based software application that may be used by an intake engineer (hereinafter "Intaker") or other expert user of System 100A, to determine and/or establish lighting and/or other energy needs for one or more physical structures managed by System 100A. Using at least the user interfaces provided System Intake Application Module 130, the Intaker may select one or more buildings from a Map view presented by Application Module 130. The Intake may further use Application Module 130 to load an existing floor plan for a particular floor of a selected building, and proceed to establish special areas (e.g. open plan office space, meeting rooms) and system devices (e.g. light sources, light source grids, gateways, switches) for use in these spaces, as well as provide various annotations associated with the spaces and devices (e.g. notes, photographs, voice recordings). System Intake Application Module 130 also allows the Intaker to check the intake process to make sure, for example, that luminaires/light sources are properly allocated to designated areas, as well as properly allocated to respective gateways. This information from System Intake Application Module 130 may thereafter be used to populate the Projects Database 170A. System Intake Application Module 130 is discussed in more detail in the description associated with FIG. 6.

System Project Application Module 140 is a cloud-based software application that may be used by Intakers, Experts, Installers, Administrators, and End Users associated with System 100A, to create and view Project hierarchies stored in Projects Database 170A. Application Module 140 also dispatches created and updated projects to other application modules such as the System Map Application Module 160, System Energy Application Module 120 or System Intake Application Module 130. A Project hierarchy may be created, for example, by having a user with appropriate privileges, such as an Administrator, specify an entity associated with the project (e.g. an organization such as a Corporation). Thereafter, the Administrator might add physical sites associated with the entity (e.g. the physical site in Amsterdam). For each physical site or location, the Administrator might thereafter add one or more buildings, and their associated addresses and other identifying details. For each building, the Administrator may also specify energy settings information such as total installed power, standby total power, whether or not the energy baseline is dynamic, and the like. Details such as working hours and working days associated with each building or physical site may also be specified. System Project Application Module 140 is discussed in more detail in the description associated with FIG. 6.

User Management Application Module 150 is a cloud-based software application for managing users related to System 100A. Users may be allowed varying levels of access privileges to System 100A depending on their designation (e.g. Installer, Administrator, Project Manager, Expert, Intaker, or End User). Other designations are also possible to specify. Users may be associated with particular buildings or with entire projects. User Management Application Module 150 may provide a variety of user interfaces that allows a credentialed individual or entity to access the Projects Database 170A, and create, update and delete users associated with a Project hierarchy or users associated with particular buildings/sites within a particular Project hierarchy. For example, an Administrator with privileges to manage users associated with the Project hierarchy of Corporation A may add a user with a role of Installer with a particular name, address, age and other particulars, and assign appropriate access privileges that allows this user to utilize System Intake Application Module 130 and System Project Application Module 140 to perform an installation of devices such as luminaires, switches and gateways to buildings at various sites associated with Corporation A's Project hierarchy. User Management Application Module 150 is discussed in more detail in the description associated with FIG. 6.

System Map Application Module 160 is a cloud-based software application that may be used by users who are Installers to register, localize, as well as deploy configuration information to various system devices (e.g. luminaires, sensors, switches, gateways) associated with a project hierarchy. It may present localization information associated with these devices, map views of various floors of buildings, and the locations of associated system devices on the floor plans of each floor. It may allow Installers to graphically add, remove, or relocate system devices on interactive maps/floor plans, and depict other configuration information associated with these devices on the same. In order to facilitate installation, the Application Module 160 may render its front end on mobile devices such as smart phones or tablet computers that Installers may use while at an install site. System Map Application Module 160 is discussed in more detail in the description associated with FIG. 6.

Building Server 100 is a system device that acts as a data gateway between a physical building and a cloud, such as Cloud 115. Among its many tasks, it routes configuration data from the cloud to the system devices in the building, routes energy consumption data from the devices to the cloud, buffers energy consumption data to anticipate temporary connectivity loss with the cloud, and routes environmental metric data and diagnostic data from the building to the cloud, the environmental metric data including, for example, building occupancy data and the diagnostic data including, for example, sensic diagnostic data. Building Server 100 may also perform various system management tasks. For example, it may provide time synchronization to gateways, manage software/firmware upgrade processes (e.g. handling software/firmware update triggers coming from Cloud 115, and storing software/firmware images for gateways and sensics), and implement building-wide functions (e.g. schedulers, ADR). Building Server 100 may use the following external interfaces: MQTT, to get configuration data of system devices from Cloud 115, to push discovery messages to Cloud 115, and to notify the various gateways about software/firmware updates. Building Server 100 may also use HTTPS to register devices in Cloud 115, to provide energy usage and other environmental metric data to Cloud 115, and to serve software/firmware updates to the gateways and other system devices. Building Server 100 may also employ the ZeroC (ICE) inter-process communication framework to exchange data between MQTT and the network provider (e.g. low-level Dynalite protocol), to exchange security data between applications.

Gateway 110A or 110B may be implemented in hardware, any combination of hardware and computer code (e.g. software or microcode), or entirely in computer code. This module may be executed on one or multiple processors. In some embodiments, a hardware implementation of gateway 110A or 110B may involve an STM32 chip. Gateway 110A or 110B may be associated with a particular floor of a physical structure, and may send and/or receive data from multiple system devices such as luminaires located on that floor. In some embodiments, Gateway 110A or 110B may send and/or receive data from a large number (e.g. 1000) system devices such as luminaires, sensors and HVAC devices.

Gateway 110A or 110B may be configured to provide a variety of functions. For example, it may provide a gateway between an interface (e.g. EnvisionIP) for use in commissioning luminaires and another (e.g. the RS-485 standard), as well as provide services for translating between various application and network protocols. In many embodiments, it may also facilitate the routing of data between multiple gateways within system 100A, and participate in system diagnostics and/or hardware roll calls during which the gateway 110A or 110B may determine whether or not devices under its control are still online. Gateway 110A or 110B may also be responsible for caching and/or reporting offline devices, for local scheduling tasks and the management of monitoring and diagnostic data. For example, Gateway 110A or 110B may monitor one or more areas within a physical structure for energy consumption and occupancy, and diagnose and report system health information on the area level. It may also store area monitoring information.

In some embodiments, Gateway 110A or 110B monitors all DyNet and EnvisionIP traffic in a part of the system. It may store and/or cache this information, and forward this information to other system modules so that system 100A has an accurate overview of the state of all the commissioned system devices at any given time. In many embodiments, multiple gateway modules such as Gateway 110A and 110B may be communicatively linked with a single Building Server 100, where each gateway acts as a floor controller for a particular floor of a building. Functionally, a Gateway 110A or 110B may be broken down into the following functional components: a FW update component, an NTP client component, a WG diagnostics component, a Discovery and Registration component, and a ZigBee clock synchronization server component. The FW update module, like the similarly named module of the Building Server is primarily responsible for coordinating the firmware and software updates for itself and for sensic devices. This process is described in further detail in the context of the FIG. 9. The NTP client component is similar to the similarly named module in the Building Server, in that it participates in pushing time data (e.g. for time stamping environmental metric data) to the sensic devices. The ZigBee Clock Sync Server module also participates in time synchronization, and the related time stamping and time synchronization processes are explained in more detail in the description accompanying FIGS. 7A-C. The WG diagnostics component is primarily responsible for reporting error or otherwise abnormal conditions or states encountered during the routine operation of a gateway. These error conditions or states are thereafter reported up to the Cloud (e.g. Cloud 115) via the Building Server for further analysis. Lastly, the Discovery and Registration component is primarily responsible for enabling the gateway to register itself with the Building Server and/or the Cloud.

Devices 101-106 are system devices such as third party ZigBee devices, ZigBee green power switches and battery powered sensors. They also include Lumic and Sensic devices, which can communicate with both gateways like Gateway 110A or 110B, as well as luminaire drivers and luminaires themselves. Sensics and Lumics may be implemented in software, hardware, or firmware, and contain modules for occupancy or daylight control of luminaires/device drivers, actuators for controlling luminaires/device drivers, sensor(s) to sense ambient lighting or other environmental conditions, a clock synchronization module, a mechanism for keeping track of what, if any templates have been deployed to their respective luminaire/device drivers, as well as a mechanism for preparing a report on the behavior of their respective luminaire/device drivers.

The Sensic luminaire is an example of a Sensic/Lumic device. It is typically associated with a sensor, a light source, and a control module. In some embodiments, the sensor and light source are located within the same device or housing. In some embodiments, the control module comprises computer code (e.g. software or microcode) executing on one or more processors housed within the same device or housing the sensor and/or light source. The light source may be capable of performing one or more light actuating functions, such as turning on/off, dimming, and tunable white light or colored light production. The sensor is a sensor capable of sensing, for example, one or more of daylight, occupancy, IR, carbon dioxide, humidity and temperature. The control module provides one or more control functions for controlling the behavior of other modules and devices, such as one or more light sources, sensors, gateways, and other IP luminaires. Additionally, an IP luminaire may provide one or more external interfaces for communicating with other modules of system 100A.

Projects 170A is a database that stores and makes accessible data related to the created project hierarchies associated with a System 100A. This database is accessible via Cloud 115 to external entities such as the Building Server 100 and to cloud-based application modules such as System Intake Application Module 130, System Project Application Module 140 and System Map Application Module 160. Data 170B is a database that stores and makes accessible data related to energy usage that is gathered by the various sensic devices, as well as aggregated/analytic data related to space and resource usage. Analytics data may also be stored in other data repositories accessible to Data 170B, or prepared on the fly with data extracted from the Data 170B. Data Platform Module 180 is a data acquisition, management and storage mechanism that provides to industrial-grade big-data lighting or energy infrastructures, the software and hardware structures and services to efficiently manage and efficiently retrieve data of various formats from diverse sources. Its various features are discussed in more detail in FIGS. 2 and 3.

Cloud Connectivity Service Module 190 allows connectivity between applications in the cloud and data resources accessible to the cloud (e.g. System Energy Application Module 120, the Projects database 170A, and Data Platform Module 180) and the Building Server 100. In various embodiments, it uses the MQTT protocol to move device configuration and control back and forth between Cloud 115 and the Building Server 100. Device registration, and firmware or software update data for the Building Server 100, Gateways 110A and 110B, and sensic devices, as well as building/energy usage metrics are transferred between Cloud 115 and Building Server 100 using the HTTPs protocol.

What follows is a brief description of an exemplary use of System 100A. At a high level, an Installer (e.g. a user assigned the role of an Installer) while in a physical building, installs the Building Server 100 first, using, for example, the System Intake Application Module 130, whose front end is being rendered on their mobile device. Thereafter, the Building Server 100 accesses a registration service in Cloud 115 to register itself. The Registration process is described in more detail in the description associated with FIGS. 8A and 8B. Essentially, the registration process involves a simple bootstrapping process that ensures connectivity between Building Server 100 and Cloud 115 for data reporting purposes. After the Installer has successfully installed the Building Server 100, the installer installs the Gateways (e.g. 110A and 110B) and connects them to the IP backbone of the Building. When the Gateways are powered on, they are able to automatically "discover" the Building Server 100. The Gateways will thereafter use the Building Server 100 to register themselves with Cloud 115. Details of how this is done will be discussed in connection with other figures in this application. After successful installation, an associated project hierarchy in the cloud (e.g. stored in the Projects 170A database) will have all the necessary data for operation of System 100A. The ZigBee® protocol is the most common protocol for communicating environmental metric data as well as firmware/software update data between the System/Sensic devices and the Gateways. The Gateways and the Building Server also use other communication protocols (e.g. TLS and HTTPs) to communicate firmware/software update data for the Gateways and the Sensic devices, as well as to communicate environmental metric data such as device/energy usage metrics.

Next, the Installer goes into the Building with a cloud-based application such as System Map Application Module 160 running on a portable device such as a tablet computer. The Installer scans the QR code of the Building Server 100. The QR code contains a unique identifier associated with the Building Server 100. Application Module 160 is able to retrieve project hierarchy data associated with the Building Server 100 from the Projects 170A database, localize the Building Server 100 based on the Installer's selection of the Building Server's location on a floor plan depicted on Application Module 160, and update the Projects 170A database as necessary with additional information (e.g. localization information) about the Building Server 100.

Next, the Installer localizes Sensic devices such as ZigBee luminaires. An application such as System Map Application Module 160 retrieves relevant project hierarchy data from the Projects 170A database, and the Installer physically goes to the each luminaire and selects an icon representing the luminaire on the floor plan. Using a device such as an IR remote control, the Installer can then add the device to a personal area network such as a ZigBee network. The physical luminaire can then use the ZigBee network to communicate with an assigned Gateway (e.g. Gateway 110A). Configuration information, such as which Gateway should be responsible for which System device, is stored in the Projects 170A database. Accordingly, when a luminaire is selected, Cloud 115 already "knows" which Gateway connection needs to be opened to formally add the device to the Gateway. The Gateway—System device localization is a two-fold process. Cloud 115 sends, via Building Server 100, a command to a particular Gateway, to add a Device such as a Luminaire to itself. The Device or Luminaire itself attempts to join the ZigBee network of the particular Gateway, and upon successfully joining the network, it announces itself to the particular Gateway.

Once localization, as briefly described above, has been completed, Cloud 115 will deploy configuration data to the various System/Sensic devices via the Building Server and Gateways. Configuration data includes, for example, data that controls behavior of devices such as luminaires. Such data includes information on how a device should react to a sensor indicating that an area is now occupied. When configuration deployment is completed, this fact will be visualized on the System Map Application Module 160. For example, a luminaire that has successfully received its configuration data will be represented by a changed icon. Once localization and configuration data deployment has been completed, the Installer has the option of verifying whether aspects of the localization and deployment were successful. For example, Application Module 160 provides a guided test procedure to test the behavior of deployed luminaires. Once any such tests are completed successfully, the building is considered to be commissioned.

Data Acquisition Components and Infrastructure

Figure 2:
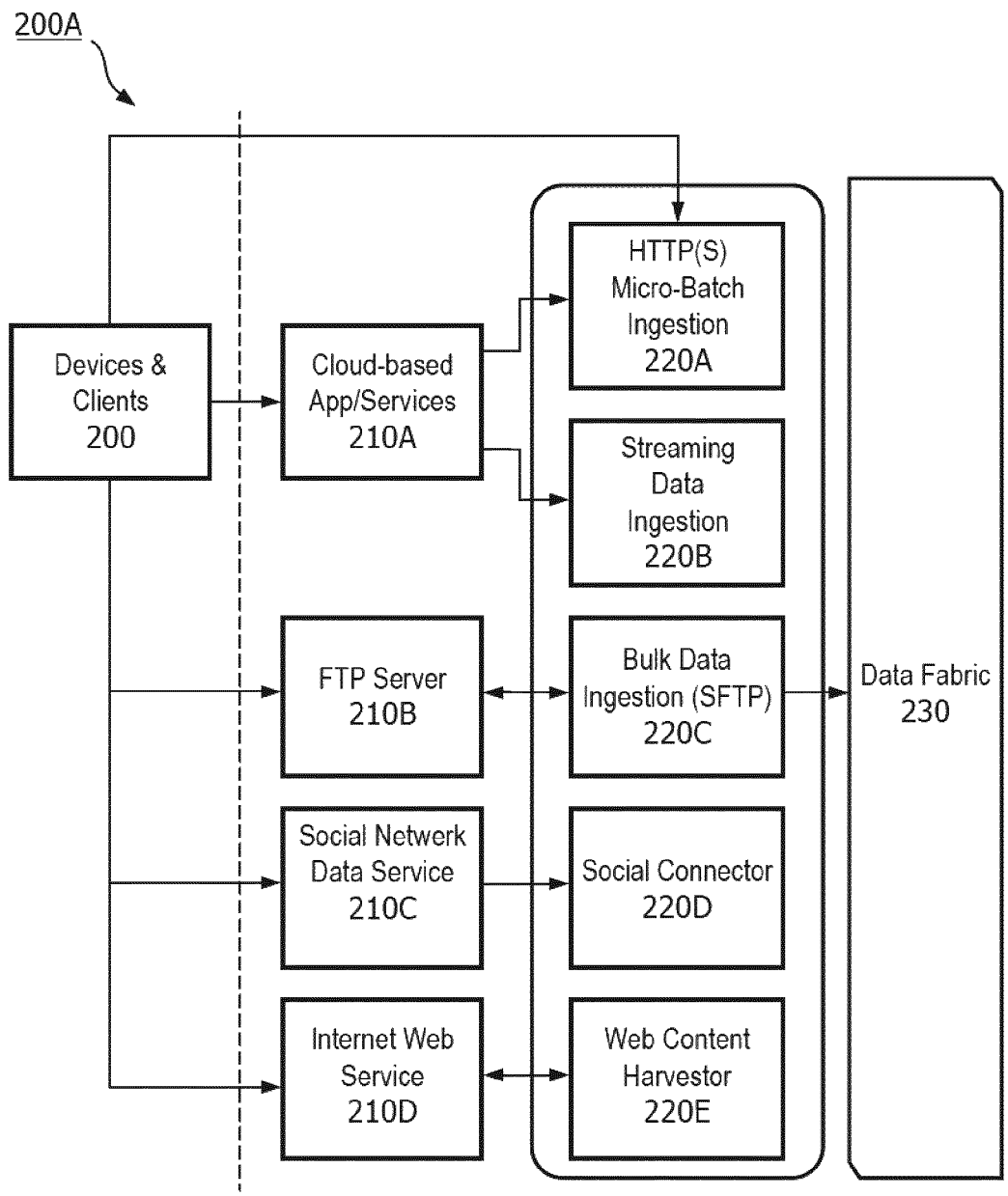
FIG. 2 illustrates exemplary data flow from various sources into a data platform that manages the flow of information associated with a monitored space.

FIG. 2 depicts a System of information flow (200A) for data acquisition purposes, as used in Data Platform Module 180 of System 100A. This system provides a standardization around a finite number of mechanisms to reliably ingest/acquire data from either the internally accessible lighting infrastructure or other external sources. Examples of external sources of data are data from social networks such as Twitter® and Facebook®, weather data, security data, and scheduling data such as meeting room schedules. System 200A is essentially the internal plumbing that enables data flows to be connected with downstream consumption in both batch and real or near-real time. Real or near-real time data will enable low-latency real-time application experiences.

Data acquisition in the context of the systems, methods, and apparatus for cloud-based monitoring and control of physical environments as described herein is focused on providing mechanisms or data acquisition services 220A-E to facilitate the scalable and reliable ingestion of data from diverse sources. These mechanisms are HTTP(S) Micro Batch Ingestion (220A), Streaming Data Ingestion (220B), Bulk Data Ingestion (220C), Social Connector (220D) and Web Content Harvestor (220E).

A library (e.g. SDK) may be used by clients to enable simplified interaction with both the HTTP(S) (220A) and Streaming (220B) interfaces. An example of HTTP(S) Micro Batch Ingestion (220A) is an application programming interface (API) that may provide, for example, standard internet facing HTTPS-based data for ingestion into the Data Fabric 230. It may use standard HTTP semantics, and is typically designed for small payloads with high horizontal scalability requirements. For example, the HTTP(S) Micro Batch Ingestion API 220A may be designed to accommodate tens of thousands of requests per second. This API may typically be viewed as a Device-to-Server API. An example of Streaming Data Ingestion (220B) is a service or API that is designed for data acquisition over a persistent or long lived data network connection. This type of data ingestion is typically Server-to-Server. An example of Bulk Data Ingestion (220C) is typically an SFTP standards compliant interface for large binary object ingestion. Examples of large binary objects include large zip files and long video clips. An example of Social Connector (220D) is an API designed to allow services such as Social Network Data Services 210C to access the Data Fabric 230. It primarily allows for the real time ingestion of data from social networks such as Twitter® and Facebook®. Based on predetermined criteria, particular types of data of interest from social networks are allowed to be ingested using the 220D API. This information may be, for example, demographic or user profile information, or location information. And an example of Web Content Harvestor (220E) is a service or API for extracting content from internet websites for analytic purposes. For example, typical energy usage in buildings in a particular area may be used to benchmark energy usage in a nearby building being monitored by a system such as System 100A.

Devices and Clients 200 represents software, firmware and hardware agents. For example, data may be delivered directly or acquired via a business app/service acting as a gateway or proxy. Data from some sources may be routed through Clouds/Servers such as the Cloud-based Apps/Services 210A (e.g. server/app logs) for ingestion into System 200A. The proxy approach of the Cloud-based Apps/Services 210A does not, however, preclude the service from consuming data itself and performing some integral action (e.g. updating a database as a result of an HTTP transaction). However, in most such cases, the underlying message characteristics derived from the client also reaches the Data Acquisition System 200A to enable downstream analysis and/or consumption. Other Cloud/Server examples through which data from Devices & Clients (200) may be routed include FTP Server (210B), Social Network Data Service (210C) and Internet Web Service (210D). Examples of an FTP Server 210B includes any server that uses the FTP network protocol or any derivative or extension thereof (e.g. FTPS, SSH, TFTP or SFTP) to transfer files between a client and server. Examples of a Social Network Data Service 210C includes data services provided by social networks like Twitter® or Facebook®. Examples of Internet Web Service 210D includes any service offered by an electronic device to another electronic device communicating via the World Wide Web (WWW). Internet Web Service 210D may use the HTTP protocol for transferring machine readable file formats such as XML. Internet Web Service 210D is any web service that provides a web-based interface to one or more database servers in order to provide content and/or a user interface to an end user.

The Data Fabric 230 is a data pipe that lies between the data producer and the data consumer. It comprises a data broker that enables data producers to be decoupled from data consumers, and a routing component that can control access as well as ensure that the appropriate data sets are delivered to the appropriate data consumers. The routing component comprises a horizontally scalable, highly available, highly durable persistent queue that supports multiple concurrent producers and consumers. It provides an API/interface for inbound message acceptance, as well as an API/interface for internal consumption. The Data Fabric 230 is data-driven in that it can configure a new data set and associate data sinks as appropriate with new data sets. Accordingly, there should typically be no need to re-deploy data fabric subsystems to manage the configuration of data flow within the data fabric itself. The routing component is also responsible for figuring out whether and where to send each message (e.g. to which data sink). In effect, it not only routes but also multiplexes (e.g. it is capable of sending the same message to multiple destinations as appropriate). The data sinks may be standard off the shelf data sinks. For example, a data sink may be one that is used to write (collated) messages (sets) to S3 storage. A data sink may also be one that enables near real-time consumption of messages by downstream application processing. As a general principle, all data (irrespective of source) is routed via the Data Fabric. For small data (KBs), data is delivered 'inline' within data fabric messages. For larger data sets, the data is serialized to external storage and a "pointer" is provided via a data fabric message. This approach may be used to enable near-real-time processing of larger data sets (e.g. binary content such as audio, images and video).

Solely for the purpose of illustration, we now provide an example of data flow through the system 200A depicted in FIG. 2. Occupancy sensors determine that an office has become unoccupied and as a result, luminaires lower the light level to a predetermined level. Energy usage metrics collected over a contiguous period of time during which the office was in use is time stamped and sent to an appropriate wireless gateway (e.g. Gateway 110A of FIG. 1) through, for example, the ZigBee® communication protocol. The wireless gateway thereafter, after acquiring similar metrics data from other offices on the same floor of the building, communicates this information, via the HTTPS protocol to the Building Server (e.g. Building Server 100 of FIG. 1). The Building Server uses the HTTPS protocol to communicate the metric data to a cloud-based application 210A. Cloud-based application service 210A may be required to authenticate the Building Server sending the data to it, and thereafter, depending on the type of data presented to itself, invoke the appropriate function calls to either the HTTPS Micro-Batch Ingestion 220A API or Streaming Data Ingestion API 220B. Thereafter, the data is further processed and cataloged by the Data Fabric 230, and stored in a cloud-accessible database such as the Data database 170B depicted in FIG. 1.

Figure 3:
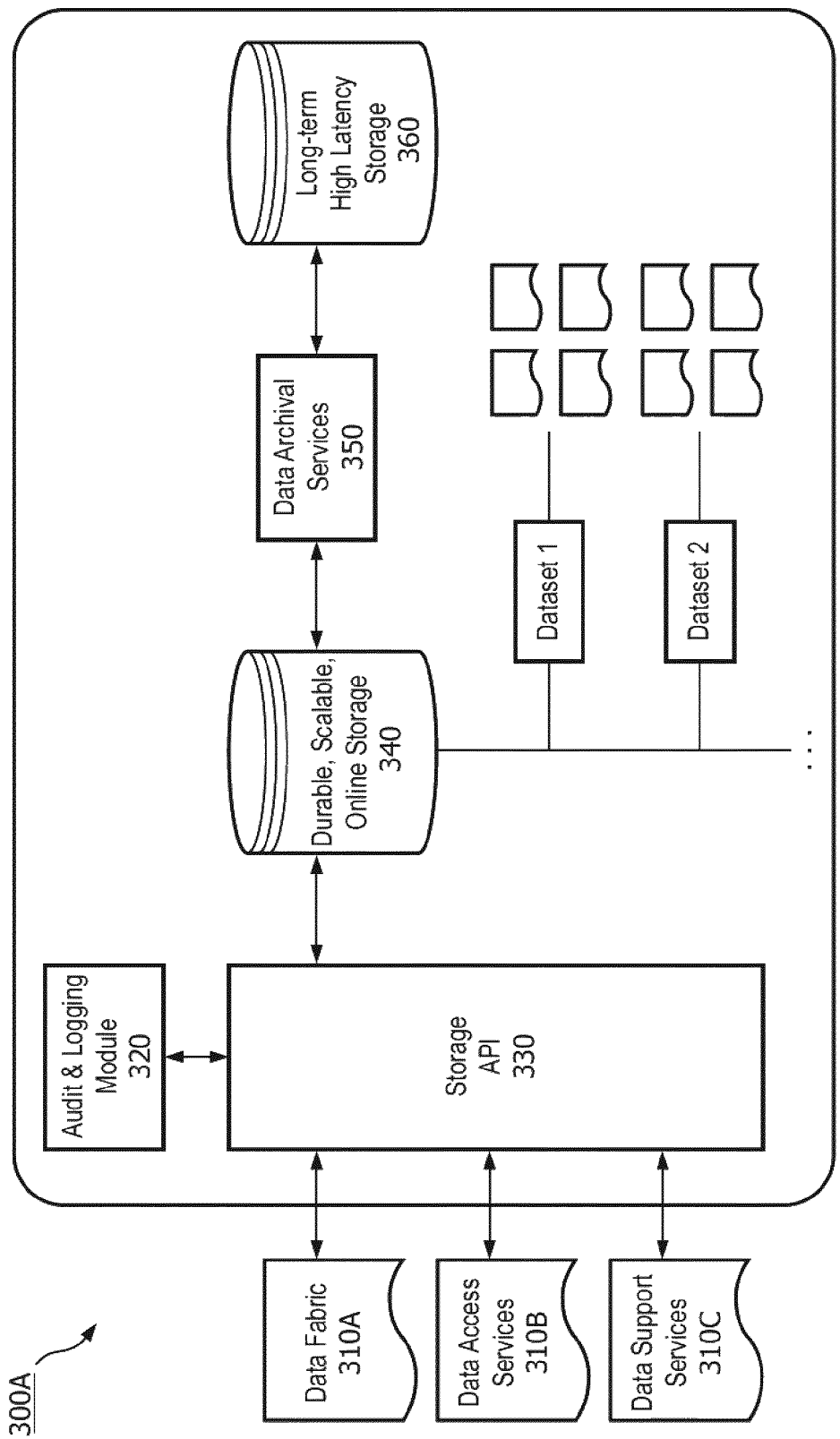
FIG. 3 illustrates an embodiment of a data storage and manipulation system utilized by an embodiment of a system for cloud-based monitoring and control of physical environments.

FIG. 3 illustrates an embodiment of the master data storage utilized by the Data Platform Module 180 of FIG. 1. In general, all data ingested into the Data Platform Module 180 may be persisted to the Data Platform's primary storage, effectively an orchestrated tier on top of a cloud storage service such as Amazon Web Services (AWS) Simple Storage Service (S3). Many embodiments of the Data Platform Module 180 may rely on such cloud storage services for availability and durability. In addition, the platform introduces data organizational constructs to segregate and organize data into different cloud storage locations according to the type of data being ingested into the platform.

FIG. 3 illustrates how data from various sources (e.g. Data Fabric 310A, Data Access Services 310B, and Data Support Services 310C) are handled by the Master Data Storage and related Services that is an integral part of the Data Platform Module 160. Data Fabric 310A is any type of Data Fabric 230 described in the context of FIG. 2. Data Support Services 310B is infrastructure that controls access to data stored in Storage 340. Its main purpose is to provide access control or authentication services in order to determine if the party invoking calls to the Storage API 330 has the necessary privileges/clearance. Storage API 330 is able to receive the diversity of data from Data Fabric 310A when the Data Fabric 310A invokes its functional interfaces. It may then perform various actions on the data itself, such as aggregate certain data as necessary, or anonymize data as necessary, before it is indexed and stored in Durable, Scalable Online Storage 340. The Audit & Logging Module 320 is primarily responsible for recording or logging calls to Storage API 330. Details about the party initiating the call to the API as well as results of the Data Access Services 310B authenticating said party are also recorded by Module 320. Reads from and writes to the Durable Storage Module 340 may also be recorded by Logging Module 320.

Data Archival Services 350 represents a software or firmware module that contains and/or implements policies or rules that govern when data can be archived (e.g. sent to Long-term High Latency Storage 360) or deleted, and mechanisms to archive or restore data (e.g. from long term storage such as Storage 360). In other words, Data Archival Services 350 implements a pre-determined life cycle policy for data that is ingested by the Data Fabric and then stored in the Durable Storage 340. Durable Storage 340 is typically used for organizing and storing a diverse variety of data from a variety of sources (e.g. Hue® data from a home) without intermingling the data. Essentially, Durable Storage 340 implements methodologies for separately maintaining the data itself, as well as meta-data associated with the data. There are many ways to separate the data, for storage and analysis purposes. For example, a top level of a data hierarchy may separate large scale office park project data from data coming for the homes of individuals. A second level of data hierarchy may be implemented by separating data based on customer identity or geo-locality. Dataset 1 and Dataset 2 in FIG. 3 represent different data sets that are not intermingled and maintained separately for easy accessibility by Durable Storage 340.

Device Commissioning

Figure 4:
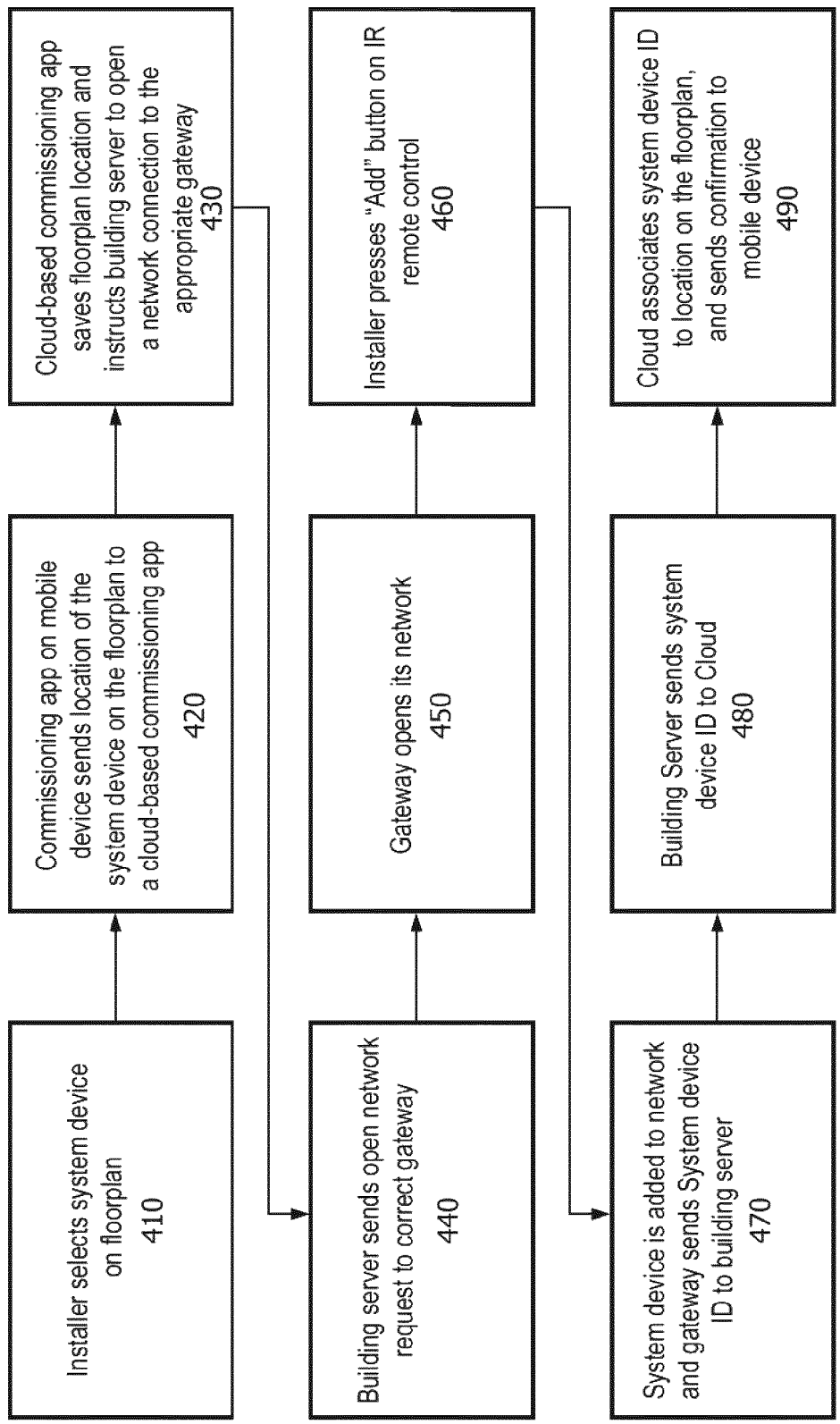
FIG. 4 illustrates an embodiment of a method for commissioning devices for use within an embodiment of a system for the cloud-based monitoring and control of physical environments.

FIG. 4 illustrates an embodiment of a method for commissioning devices for use within a system for cloud-based monitoring and control of a physical environment such as system 100A of FIG. 1. In step 410, an Installer, such as the Installer described with respect to system 100A selects a system device (e.g. a luminaire) on a floor plan on a cloud-based commissioning application such as System Map Application Module 160 described in relation to system 100A of FIG. 1. The Installer is at this time inside, for example, a building that is to be monitored by a system 100A. The Application Module 130's user interface may be displayed, for example, on a mobile device such as a smart phone or tablet used by the Installer. In step 420, the commissioning application running on the Installer's mobile device sends the location of the selected system device on the floor plan to a cloud-based commissioning application (e.g. the back-end of the cloud-based System Intake Application Module 130). In step 430, the cloud-based commissioning application saves the floorplan location (e.g. in the projects 170A database associated with a project hierarchy that is linked to the building that the Installer is presently in), and instructs the building server (e.g. Building Server 100 of System 100A) associated with the building in the project hierarchy to open a network (e.g. wireless network) on the correct gateway associated with the building server. In such situations, the building server is able to identify the correct gateway (e.g. Gateway 110A or 110B of System 100A) based on the physical area the gateway is in. These areas may surround groups of devices, and alinked to a gateway by the Intaker. In step 440, the building server sends an open network request to the appropriate gateway. In step 450, the gateway responds by opening its network (e.g. a ZigBee® network). Following the successful opening of the gateway's network, in step 460, the Installer uses an IR remote control device to "add" the system device to the gateway's network. The Installer may do this by pointing the IR remote to the device in question, and then pressing the "Add" button on the IR remote control device. At this point, logic in the system device broadcasts to the gateway's open network that the system device (e.g. luminaire) wishes to be added, and the gateway both locally adds identification information from the system device to its group of associated system devices, and sends the system device's identification information to the building server (step 470). In step 480, the building server sends (e.g. via the MQTT or HTTPs protocol) via, for example, the Cloud Connectivity Service Module 190 and/or the Data Platform Module 180, the system device's identification information to the cloud (e.g. Cloud 115). In step 490, a cloud-based application such as System Intake Application Module 130 couples the system device's identification information with the location on the floorplan originally indicated by the Installer in step 410, and sends the associated application running on the Installer's mobile device a confirmation message. The confirmation message may indicate, for example, that the system device has been successfully commissioned.

Device Localization Use Cases

As discussed previously, an Installer, with the help of an application such as System Map Application Module 160, may localize Building Server 100 and Gateway 110A and 110B. This localization may be accomplished using QR codes. Other System devices such as luminaires and wall switches, on the other hand, may be localized by using IR technology or button presses, as described in the use cases below.

Typical Use Case

Figure 5A:
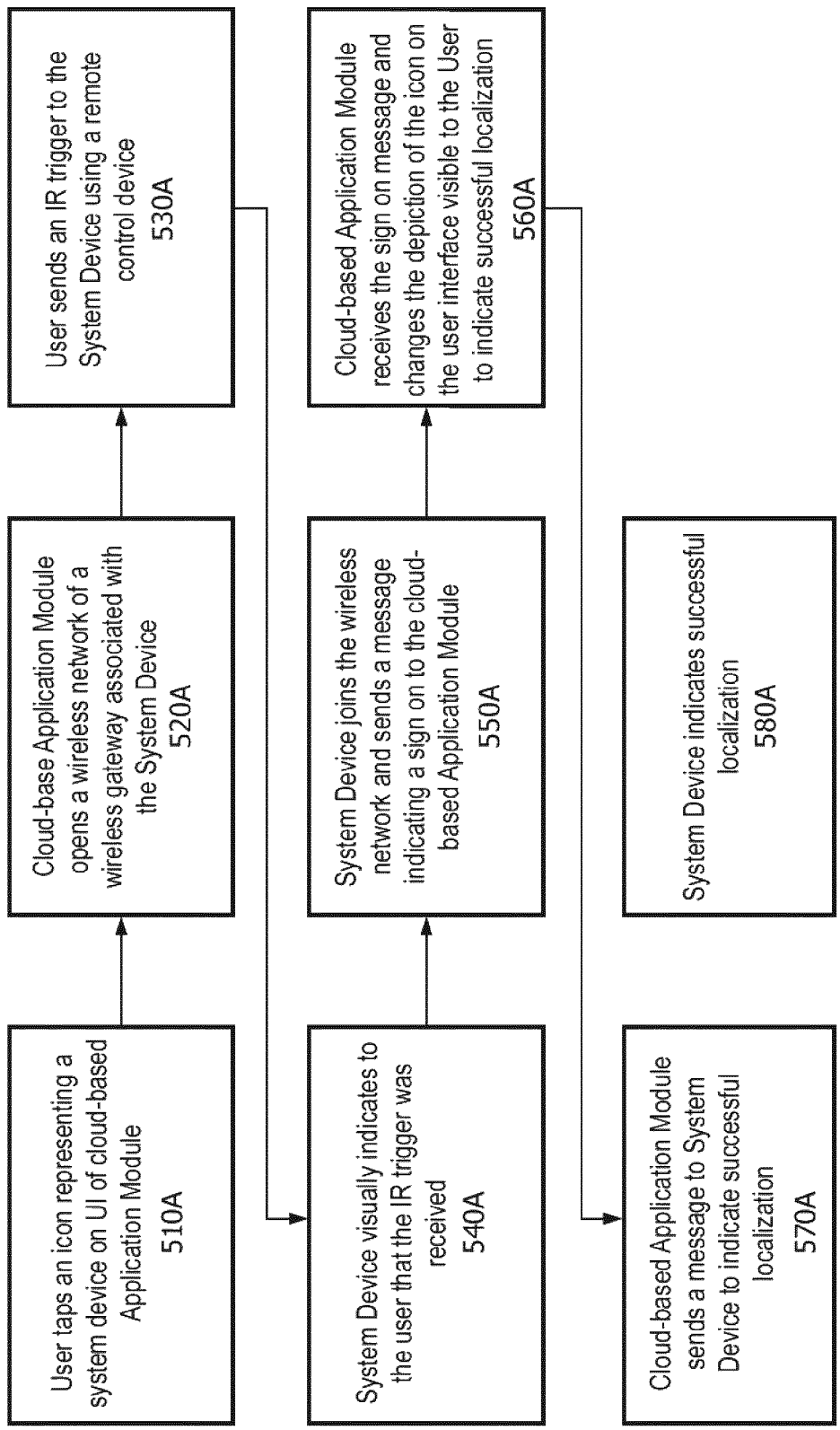
FIGS. 5A, 5B, and 5C illustrate various embodiments of device localization in a system for the cloud-based monitoring and control of physical environments.

FIG. 5A depicts a localization use case for a System device (e.g. a Sensic device such as a ceiling-mounted luminaire). In the steps depicted in FIG. 5A, a user (e.g. Installer) taps an icon representing a System device on the user interface of a cloud-based application module such as System Map Application Module 160 (Step 510A). In response, the cloud-based Application Module opens the a wireless network (e.g. a ZigBee network) of a wireless gateway (e.g. Gateway 110A) associated with the System device (Step 520A). The user then sends an infrared (IR) trigger to the System device using, for example, a remote control device (Step 530A). The System device then visually indicates to the user that the IR trigger was received (e.g. by blinking a predetermined number of times) (Step 540A). The System device joins the wireless network and sends a SignOn message to the cloud-based Application Module (Step 550A). The cloud-based Application Module receives the SignOn message, changes the depiction of the icon on the user interface visible to the user to indicate successful localization (Step 560A). The cloud-based Application Module also sends request to the System device to visually or otherwise indicate successful localization (Step 570A). For example, if the System device is a luminaire, it might request that the luminaire dim light output to 10%. Upon receiving the request, the System device complies to indicate successful localization (Step 580A). The System device is now considered to be localized. In many embodiments, after successful localization of a System device, deployment is automatically started. When deployment of System device is completed, its corresponding icon on the cloud-based Application Module will change once again to indicate its "deployed" state in order to provide feedback to the user. In some embodiments, there will be no further visual confirmation of deployment to the user once the System device has been successfully deployed.

In some situations, somewhere prior to localization being completed, and after the System device in question has indicate receipt of the IR trigger, a second IR trigger is received by the System device. In such a situation, in many embodiments, the System device will send a second SignOn message to its associated wireless gateway. However, the cloud-based Application Module will, in many embodiments, receive the second SignOn message, recognize that the SignOn message is from an already localized or localization-pending System device, and choose to simply ignore the second SignOn message (e.g. it is assumed to be an error).

Second SignOn from a Sensic on a Different Location

Figure 5B:
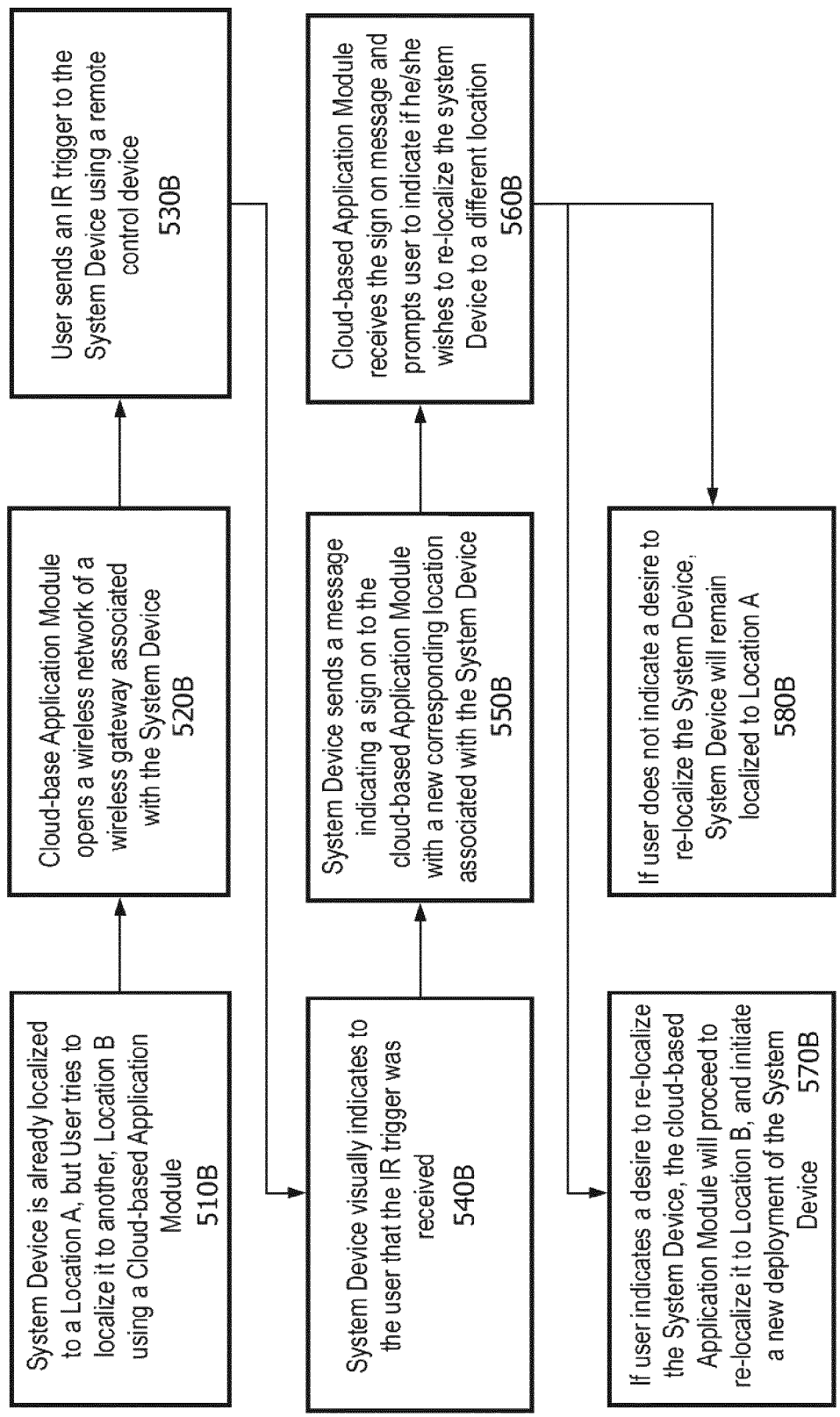

In the use case depicted in FIG. 5B, a System device is already localized to a location A (e.g. depicted on System Map Application Module 160 with particular icon), but the user nevertheless wishes to localize it to another location B (Step 510B). The user may indicate this by tapping another icon representing location B in the UI presented by Application Module 160. In response, the cloud-based Application Module opens the w wireless network (e.g. ZigBee network) of an associated wireless Gateway (e.g. Gateway 110A) (Step 520B). The user then sends an infrared trigger with a remote control device to the System device (Step 530B), and the System device responds by visually indicating to the user that the IR trigger was received (e.g by blinks a predetermined number of times) (Step 540B). Although System device may have already joined it's associated wireless Gateway's wireless network when previously localized to location A, the System device still sends a SignOn message to the cloud-based Application Module, indicating a new location corresponding to itself (location B) (Step 550B). The cloud-based Application Module receives the SignOn message with the System device's location information corresponding to Location B, even though the System device has already been mapped to a location corresponding to Location A. Upon receipt of the SignOn message, the cloud-based Application Module will, in various embodiments, prompt the user that the System device has previously been localized, and inquire if he/she wishes to re-localize (e.g. move) the System device to a new location (e.g. Location B) (Step 560B). If the user indicates that he/she does in fact wish to move the System device, then the System device will be localized to Location B and a new deployment of the System device will commence once any previously commenced deployment of the System device has completed (Step 570B). When the deployment of the System device is completed, an icon associated with the System device on the cloud-based Application Module will change to indicate the System device's new deployed state to the user. In many embodiments, there will be no visual confirmation from the System device itself to indicate that its deployment has been completed. If the user indicates that he/she does not wish to move (re-localize) the System device, no changes to the System device's localization takes place, and it remains localized to Location A (Step 580B).

Trigger a Sensic when an Already Localized Icon (or Nothing) is Selected

With respect to the scenario depicted in FIG. 5B, we can consider a modification. Consider that there are two System devices (Sensic A and B) that are located proximally to each other. For example, each may be a ceiling mounted luminaire. Assume that Sensic B is already localized to a Location B on the cloud-based Application Module (e.g. System Map Application Module 160). Also assume that in this modified scenario, the wireless network (e.g. ZigBee® network) associated with the Gateway of Sensic B is open. At this point, the user sends an infrared (IR) trigger using a remote control device to Sensic A, which has not yet been localized. Sensic A indicates receiving the IR trigger (e.g. by blinks 3 times). Sensic A also joins the wireless network and sends a SignOn message, which is received by the cloud-based Application Module. At this point, the cloud-based Application Module has received a SignOn message from a Sensic (Sensic A), but no associated Location for Sensic A to be localized to. In such a situation, in many embodiments, the cloud-based Application Module may enter a "Blinking Flow" sequence. In such a sequence, a list of non-localized Sensics may be presented. The first and only sensic in the present scenario (Sensic A) will receive a "Blink" message from the cloud-based Application Module. In response, the user will need to indicate, on the UI of the Application Module, the icon (and therefore the location) that corresponds to the blinking Sensic A. In response, the Application Module will proceed to localize Sensic A to the indicated location.

Trigger Multiple Sensics when an Unlocalized Icon (or Nothing) is Selected

Figure 5C:
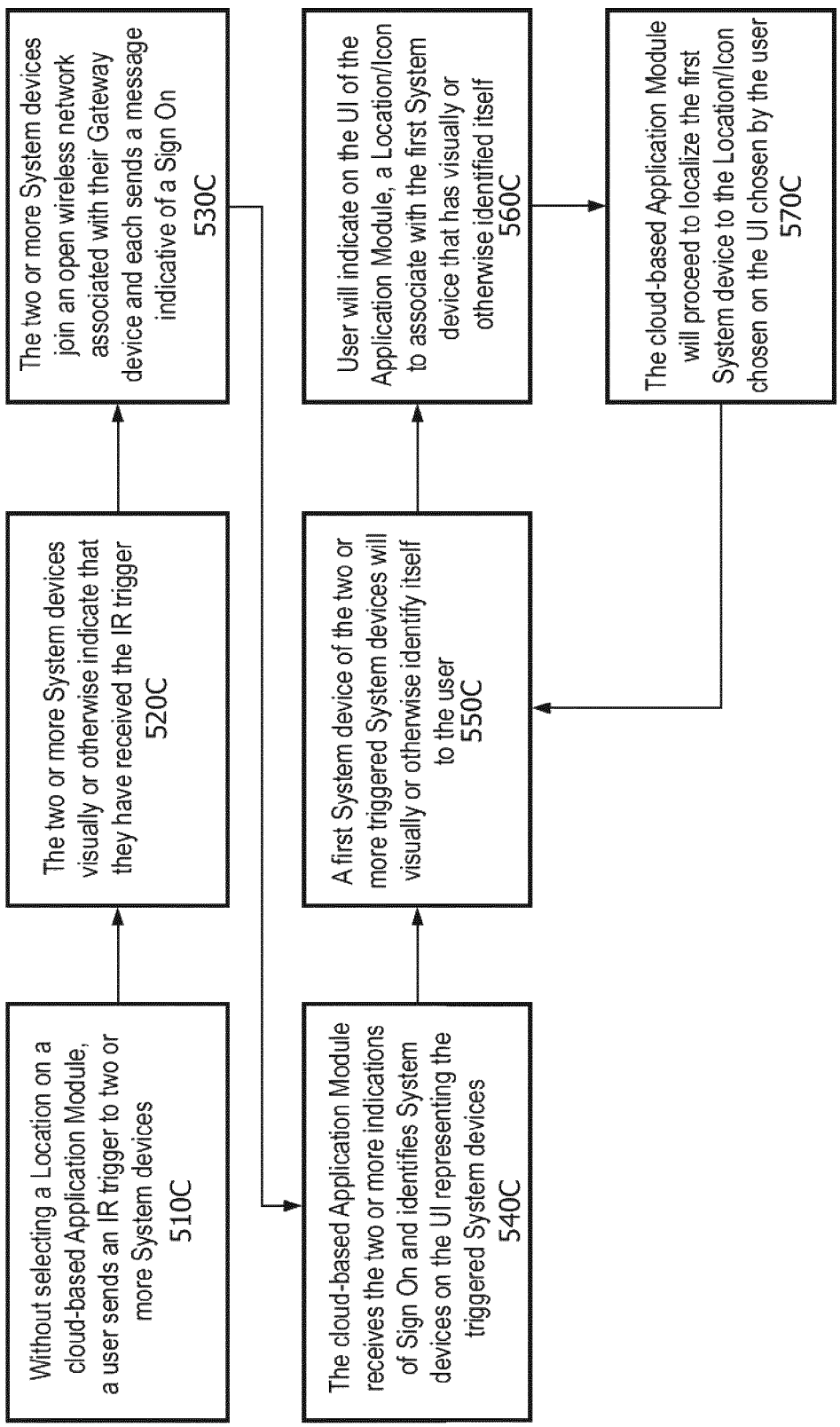

FIG. 5C depicts a scenario or use case where multiple System devices (e.g. Sensics) are triggered when no Location/Icon is selected on a cloud-based Application Module (e.g. System Map Application Module 160) used for localization. This use case may also be used to determine the sequence of events when multiple System devices are triggered with an unlocalized Icon/Location being selected on the Application Module.

In Step 510C, without selecting a Location on a cloud-based Application Module, a user (e.g. Installer) sends an IR trigger using a remote control device to two or more System devices (e.g. Sensics). In Step 520C, the two or more System devices visually or otherwise indicate that they have received the IR trigger (e.g. by blinking their lights 3 times each). The two or more System devices join an open wireless network associated with their Gateway device, and each System device sends a message indicative of a Sign On via the wireless network (e.g. a SignOn message) (Step 530C). The cloud-based Application Module receives the two or more indications of Sign On, and identifies, based for example on identifying information in their Sign On messages, corresponding System devices on the UI of the Application module (Step 540C). The identified corresponding System devices are virtual representations of the physical System devices that were triggered. In Step 550C, a first System device of the two or more triggered System devices will visually or otherwise identify itself to the user (e.g. by continuing to blink). This may be due to the cloud-based Application Module sending a first of the identified corresponding System devices a request to begin blinking. In response, the user will indicate on UI of the Application Module, which Location/Icon to associate with the blinking (or otherwise attention seeking) physical System device (Step 560C). In Step 570C, the cloud-based Application Module will proceed to localize the first System device to the user's chosen Location/Icon. Once successfully localized, the System device will also be deployed. The cloud-based application module, in conjunction with the triggered two or more System devices, will cycle through each of the System devices identified by the cloud-based Application Module as corresponding to the triggered two or more System devices, in the way depicted above, so that the user has had a chance to localize each of the triggered system devices.

Trigger Multiple Sensics of which One is Already Localized

In a use case similar to the one depicted in FIG. 5C and described above, consider that a user (e.g. Installer) has already selected a Location/Icon (e.g. Icon A) on the cloud-based Application Module (e.g. System Map Application Module 160). Assume that at this point, a wireless network (e.g. ZigBee® network) of a Gateway (e.g. Gateway 110A) associated with a few System devices (e.g. Sensics A and B) is open. The user then uses a remote control device to send an infrared (IR) trigger to both Sensics A and B. In response, Sensics A and B visually or otherwise indicates that the IR message was received (e.g. by blinking 3 times). They subsequently join the open wireless network, and each sends a SignOn message to cloud-based Application Module. The Application Module receives the two SignOn messages, one associated with Sensic A's ID and another associated with Sensic B's ID. But since Sensic A has already been localized to Icon A, the Application Module may simply disregard the SignOn message of Sensic A. In this scenario, as there is only one other Sensic left (Sensic B), Sensic B can be immediately localized to the location associated with Icon A. After successful localization, deployment of Sensic B can be initiated.

Potential Issues During Localization

In a further scenario, assume that a user (e.g. Installer) has tapped an icon (Icon A) on the UI of a cloud-based Application Module (e.g. System Map Application Module 160). A wireless network associated with a Gateway (e.g. Gateway 110A) is thereafter opened by the Application Module. The user sends an IR trigger from a remote control device to a System device (Sensic B). Sensic B indicates receipt of the IR message, by, for example, blinking three times. At this point, for illustration purposes, we discuss two potential issues that could arise to interfere with the localization process. We also discuss potential ways to address these issues.

Issue 1: System Device is Triggered but Cannot Join the Gateway's Wireless Network Sensic B may be unable to join the wireless network for a variety of reasons. For example, it may be out of range or otherwise defective. As a result, Sensic B does not send a SignOn message and does not provide the user with any visual or other indication of successful localization. Without the indication of successful indication, the user will likely realize that something went wrong in the localization process. To troubleshoot, the user can check the UI of the cloud-based Application Module to determine whether or not the Gateway associated with Sensic B or the Building Server itself is offline. Alternatively, the user may try to trigger a different as yet unlocalized System device (e.g. Sensic A) to see if the same behavior is found to occur. The user may also send a factory reset command to Sensic B using the remote control device, and thereafter try to trigger it again. Lastly, the user may replace Sensic B.

Issue 2: System Device Joins Network but Sign on Indication Doesn't Reach Cloud

Sensic B joins the open wireless network, and then attempts to send a sign on indication (e.g. SignOn message) to the cloud-based Application Module. However, if the communication links between the cloud-based Application Module and the Gateway is subsequently broken (e.g. one or more of the communication links between the Gateway and the Building Server (e.g. Building Server 100), the Building Server and the Cloud (e.g. Cloud 115), or the cloud-based Application Module and the Cloud is interrupted), localization will not be able to proceed as usual. But these breaks in connectivity will be visibly indicated on the UI of the cloud-based Application Module to the user. As the SignOn from the Sensic B will not reach the cloud-based Application Module, localization of Sensic B will not proceed. But, as soon as the interrupted connections are restored, the user can once again try to send a second IR trigger to Sensic B. Again, as before, Sensic B will blink a predetermined number of times (e.g. three) to indicate receipt of the IR message. However, this time, if the connection issues being experienced before are resolved, the cloud-based Application Module will receive the new SignOn message sent from Sensic B, and localization will continue in the manner indicated in the previous sections. Deployment will also take place following successful localization as previously indicated.

Fixing a Previous Incorrect Localization of Sensic

The following discussion is directed to some exemplary ways in which a previous incorrect localization of a System device (e.g. Sensic A) can be corrected. This discussion is for illustrative purposes only, and is not meant to be limiting. Assume that Sensic A has already been localized to a location associated with Icon A, which is an incorrect localization. There are at least two ways for a user (e.g. Installer) to fix the incorrect localization.

In a first scenario, if the user wants to localize Sensic A to Icon B instead, and he/she notices that Sensic C already physically exhibits a visual indication that it has already been localized (e.g. it is already dimmed to 10%), the user may send a factory reset command using a remote control device to Sensic C. In response, Sensic C will reset, leave the network it was previously assigned to, and send a message indicating the same (e.g. a leaveNetwork' message) to the Gateway associated with it. This sequence of events will have the effect of removing the localization of Sensic C to Icon A. In the cloud-based Application Module (e.g. System Map Application Module 160), the appearance of Icon A will accordingly change to indicate that is not currently associated with a System device. Now, the user can proceed to localize Sensic A to the location associated with Icon B (or any other icon of his/her choice).

In a second scenario, the user knows that the localization of Sensic A to Icon A did not progress as expected (e.g. something went wrong during the localization process). The user can use the cloud-based Application Module to initiate the re-localization process. The user may, for example, tap Icon A in order to unmap it from Sensic A. This will remove the localization of Sensic A to the location associated with Icon A. The cloud-based Application Module (e.g. System Map Application Module 160) will then initiate the process of removing the faulty localization. For example, it may send a "factory reset" signal to Sensic A, and Sensic A will, in response, reset and leave the wireless network of the Gateway it was previously associated with. Now, the user can localize Sensic A to the location associated with Icon B (or any other icon of his/her choice).

Exemplary Interactions Between Various Cloud-Based System Application Modules

Figure 6:
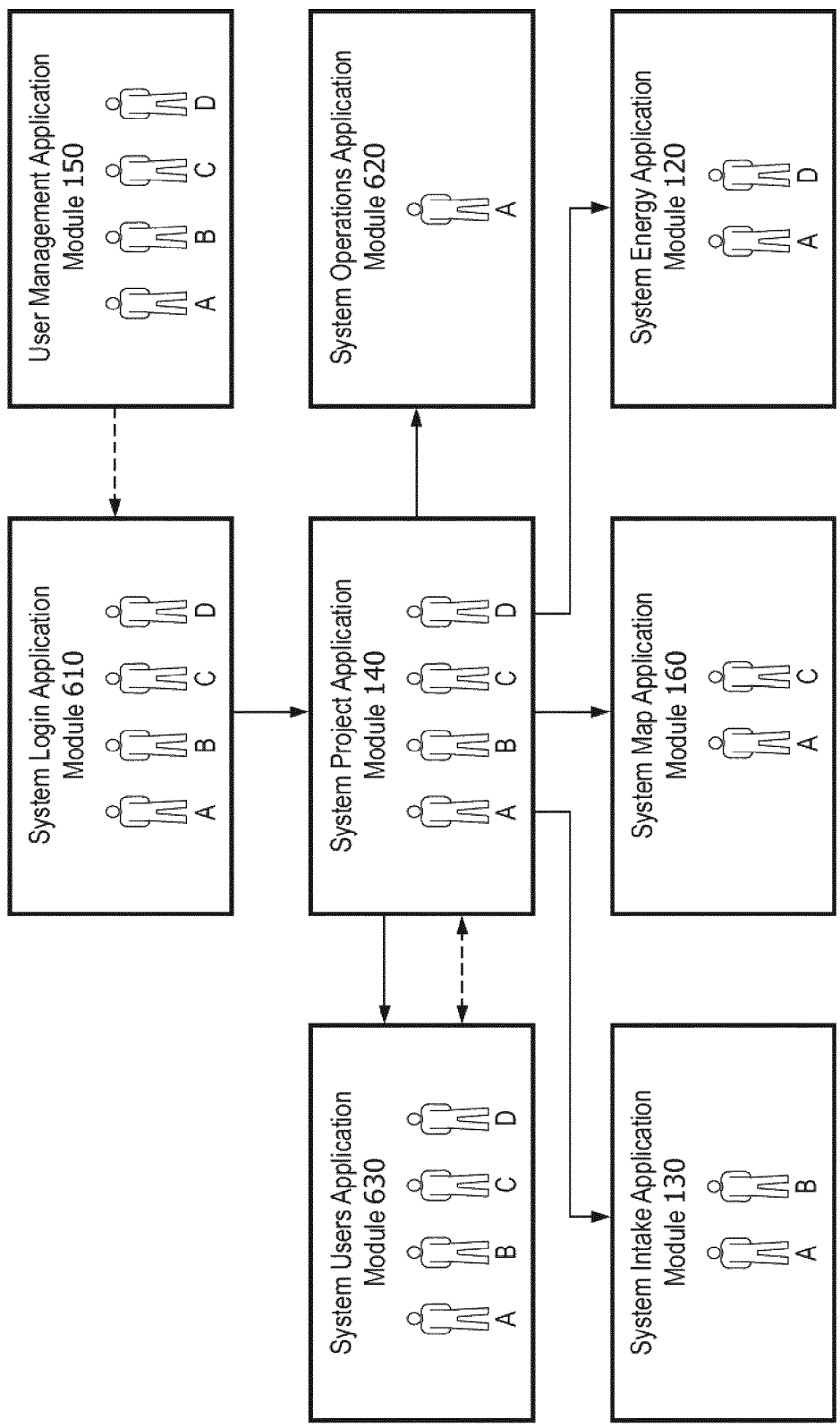
FIG. 6 illustrates an embodiment of the interaction of the various lighting applications that may be utilized by an exemplary cloud-based system for monitoring and controlling physical environments.

FIG. 6 illustrates an embodiment of the interaction of the various cloud-based system application modules that may be utilized by an exemplary cloud-based system for monitoring and control of physical environments. Some of these cloud-based applications have previously been discussed in the context of FIG. 1. FIG. 6 provides additional modules and further details regarding previously discussed modules, such as their interactions with each other and their exemplary use. Users A, B, C, and D depicted in FIG. 6 are users who are each associated with a different role. Based on a user's role, he or she may be granted access to one or more of the application modules.

User A represents operational personnel, typically associated with the entity (e.g. Company Z) that hosts and or otherwise manages the operation of the exemplary cloud-based system for monitoring and controlling physical environments itself. In various embodiments, User A has access to all project data (e.g. project hierarchies) maintained and controlled by the cloud-based system. It supports all other users, particularly User D, in maintaining the day-to-day operations of the end user in monitoring and controlling the various sites monitored by the cloud-based system. User B represents an Intake Engineer whose main function within this context may be to create a digital model of one or more buildings within a project hierarchy. User C is a person, such as an installer or commissioning engineer, whose main task may be to physically and logically install devices within a building based on a created digital model of a building, and thereafter participate in the commissioning, configuration and deployment processes. User D is personnel from a department such as facilities management, finance, or sustainability for the entity/customer (e.g. Company X) who is the end user of the exemplary cloud-based.

The User Management Application Module 150, previously discussed in the context of FIG. 1, is a cloud-based software module that, in various embodiments, allows a system administrator, or someone similarly credentialed, to create new user accounts for the cloud-based system for monitoring and controlling physical environments. For example, the system administrator may create a new user (e.g. User L) and assign that user credentials such as a username and a temporary password so that User L can thereafter use the System Login Application Module 610 to gain access to one or more of the cloud-based system application modules depicted in FIG. 6.

The System Users Application Module 630 is used, in various embodiments, to assign users to one or more project hierarchies, sites or buildings. In various embodiments of the present cloud-based monitoring and control system, the Project hierarchy is the root of a hierarchy. Each Project hierarchy may contain one or more Sites, each Site may contain one or more Buildings, each Building may contain one or more Floors. If a User (e.g. User L) is assigned to a Project hierarchy PH, then that user will have access to various features of Project hierarchy PH based on his or her role. A user's access rights may also be restricted in a customized fashion. For example, if User L is assigned to Site 1, he/she may be allowed access to only the buildings associated with Site 1, and not other sites within the project hierarchy to which Site 1 belongs.

The System Project Application Module 140, previously discussed in the context of FIG. 1, is central system application module that controls access to all other system application modules. When a user logs into the cloud-based monitoring and control system, the application module encountered by the user is the System Project Application Module 140. The user will only be able to view and/or manipulate the project hierarchy, sites or buildings to which he or she has been assigned. In various embodiments, the user's assignment to various project hierarchies, sites and/or buildings is associated with his or her login credentials (e.g. user ID), but his/her ability to access one or more system application modules such as System Map Application Module 160 or System Intake Application Module 130, are associated with his/her assigned role (e.g. Installer or Intake Engineer). Once a user has accessed the System Project Application Module 140 and is presented with, for example, one project hierarchy that he/she has been assigned to (e.g. MegaCorp), he can select the project hierarchy via user interface elements presented to him on a graphical user interface. He may then be presented with the various sites associated with project hierarchy MegaCorp (e.g. London and Shanghai). Clicking on the London site will, for example, present the user with a graphical representation (e.g. icons) of the various buildings associated with the London site (e.g. Building 1 and 2). In many embodiments, the graphical user interface of the System Project Application Module 140 presented to the user will provide the user with one or more ways to access the other system application modules to which that user has access (e.g. System Operations Application Module 620 or System Energy Application Module 120) based on the user's role and/or login credentials.

The System Intake Application Module 130 was previously discussed in the context of FIG. 1. In many embodiments, it allows an appropriately credentialed user such as a user who has been assigned the role of Operational personnel or an Intake Engineer to create a digital model of a building within a site and project hierarchy. In such embodiments, this also means that the user must also have the credentials to access the building through the System Project Application Module 140. Assuming the necessary credentials exist, the user (e.g. User L) will be presented with a user interface that allows him/her to add floorplans to graphically and logically represent various physical floors of a selected building. Once a floorplan for a floor for a particular building is selected, the user can then proceed to graphically subdivide various regions within the floorplan to depict various types of spaces (e.g. cell office, open-plan office, meeting room or corridors). The user is graphically creating a virtual layout of the floor. In various embodiments, the user is also presented with the appropriate user interface elements and functionality (e.g. drag and drop, cut-and-paste, icons representing individual devices such as luminaires and wireless gateways), so that the user can graphically depict system devices such as gateways, luminaires, grids of luminaires, switches, light and occupancy sensors, at particular locations within the many rooms or areas on a floorplan. In various aspects, configuration data, which directs the behavior of devices such as luminaires within a space (e.g. how luminaires in a particular corridor respond to a change in occupancy), are also associated with the different areas (e.g. offices, corridors, open spaces) at this stage. System Intake Application Module 130 may also be used to associate additional configuration data to further control the behavior (e.g. light output) of individual devices such as luminaires and sensors. In various embodiments, the Application Module 130 is only accessible to those users with the assigned role of Operations personnel or Intake Engineer.

According to many embodiments, the System Map Application Module 160, previously discussed in the context of FIG. 1, is typically used by a user such as an Installer while on-site at a building that is part of a project hierarchy associated with the cloud-based monitoring and control system. In many embodiments, the Installer enters the building and physically installs the devices at the locations indicated on a graphical depiction of the digital model of the building, created using, for example, the System Intake Application Module 130. The System Map Application Module 160 thereafter aids in the commissioning, localization and deployment processes described previously in the context of FIGS. 4 and 5, and also in the context of FIGS. 10, 11 and 12. In various embodiments, using Application Module 160, the Installer identifies the appropriate digital floorplan, which provides a visualization of all of the system devices are areas on the floorplan. The commissioning process begins with the building server (e.g. Building Server 100) associated with the building at hand and then continues to the various wireless gateways and the associated system devices such as luminaires and switches. As previously indicated, the Installer, using a mobile computing device such as a smart phone or tablet, selects the particular physical device that he/she wishes to commission and localize, by selecting it on the Application Module 160's user interface. The Installer then proceeds to take a picture of the QR (Quick Response®) code on the device using a camera on the smart phone or tablet, and this initiates the commissioning, localization and deployment process discussed in detail in connection with various other figures and throughout the Specification. The QR code is used purely as an example, and any other code may be used as well. In various embodiments, System Map Application Module 160 is only accessible to those users with the role of Operations personnel or Installer.

The System Energy Application Module 120, in many embodiments, may be accessed by the end user, typically operations personnel associated with the entity (e.g. Company Z) that hosts and or otherwise manages operation of the cloud-based monitoring and control system, or a facilities management personnel associated with the end user entity associated with a particular project hierarchy whose buildings are being monitored by the cloud-based monitoring system. Accordingly, in various embodiments, only users with the appropriate roles (e.g. operations personnel or facilities managers) and with appropriate access credentials are allowed access to Application Module 120. In such and other embodiments, space and resource utilization data from all monitored system devices and areas are transported via their respective gateways and the building servers to the cloud associated with the cloud-based monitoring system (e.g. Cloud 115 depicted in FIG. 1), where the data is analyzed. Statistical analysis and machine learning techniques may be employed to derive useful analytics which are then presented to the end user in the form of graphs and other visualization modes showing past usage, predictions of future energy consumption, and present (real time) energy utilization. Energy consumption data analyzed in conjunction with occupancy data may reveal physical areas and resources that are poorly utilized and therefore could contribute to strategies to lower future energy utilization.

The System Operations Application Module 620 is, in many embodiments, typically accessible only to operations personnel (e.g. User A depicted in FIG. 6) associated with the entity (e.g. Company Z) that hosts and or otherwise manages operation of the cloud-based monitoring system. It provides the user interface and back-end logic for remotely troubleshooting, diagnosing and addressing run-time issues such as inappropriate light levels, errors in energy and occupancy data collection or analysis, or inaccurate commissioning, localization or deployment.

Deployment

Figure 7A:
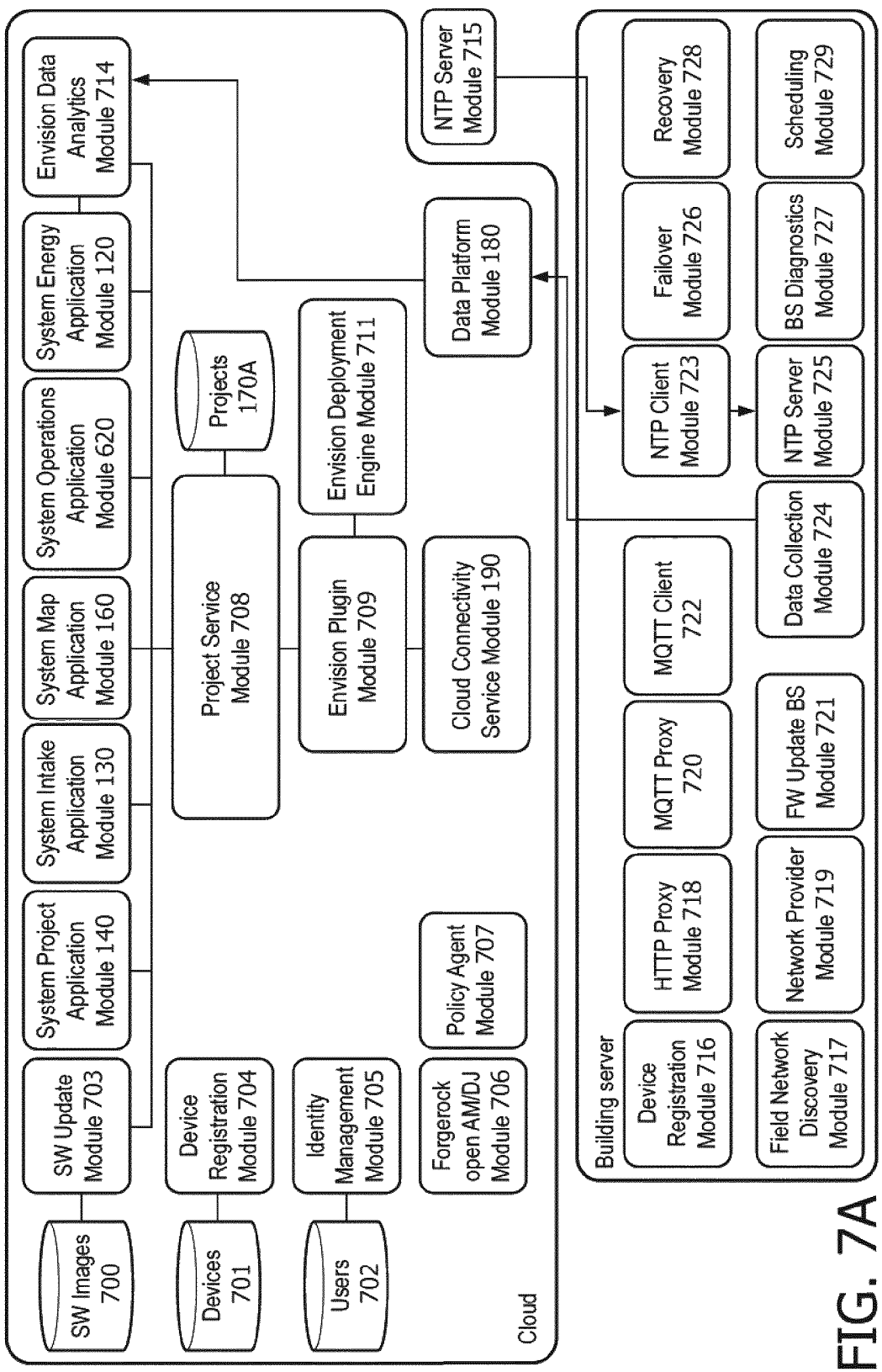
FIGS. 7A, 7B, and 7C illustrate block diagrams of embodiments of particular deployments of the exemplary cloud-based system for monitoring and controlling physical environments.
Figure 7B:
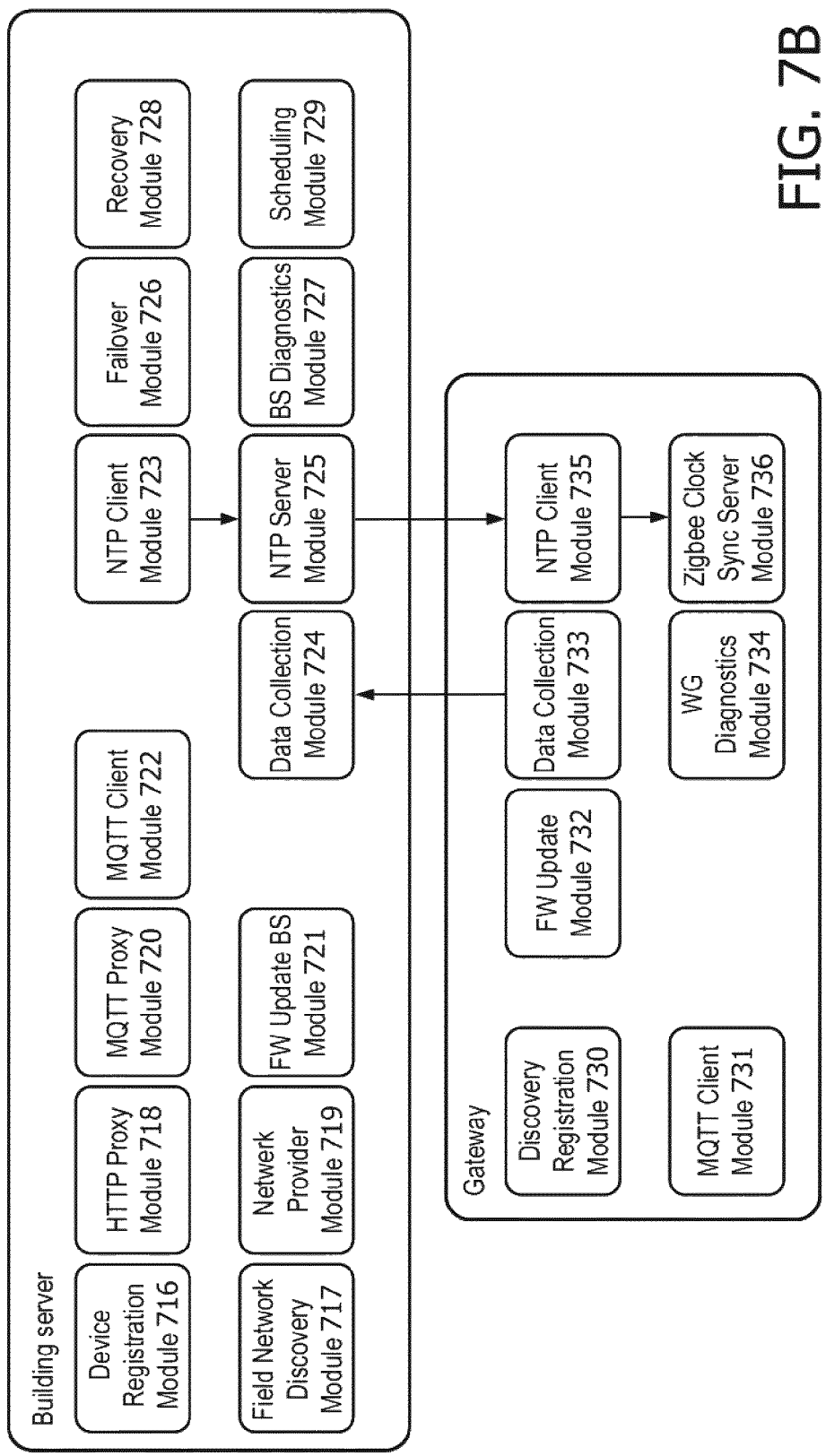
Figure 7C:
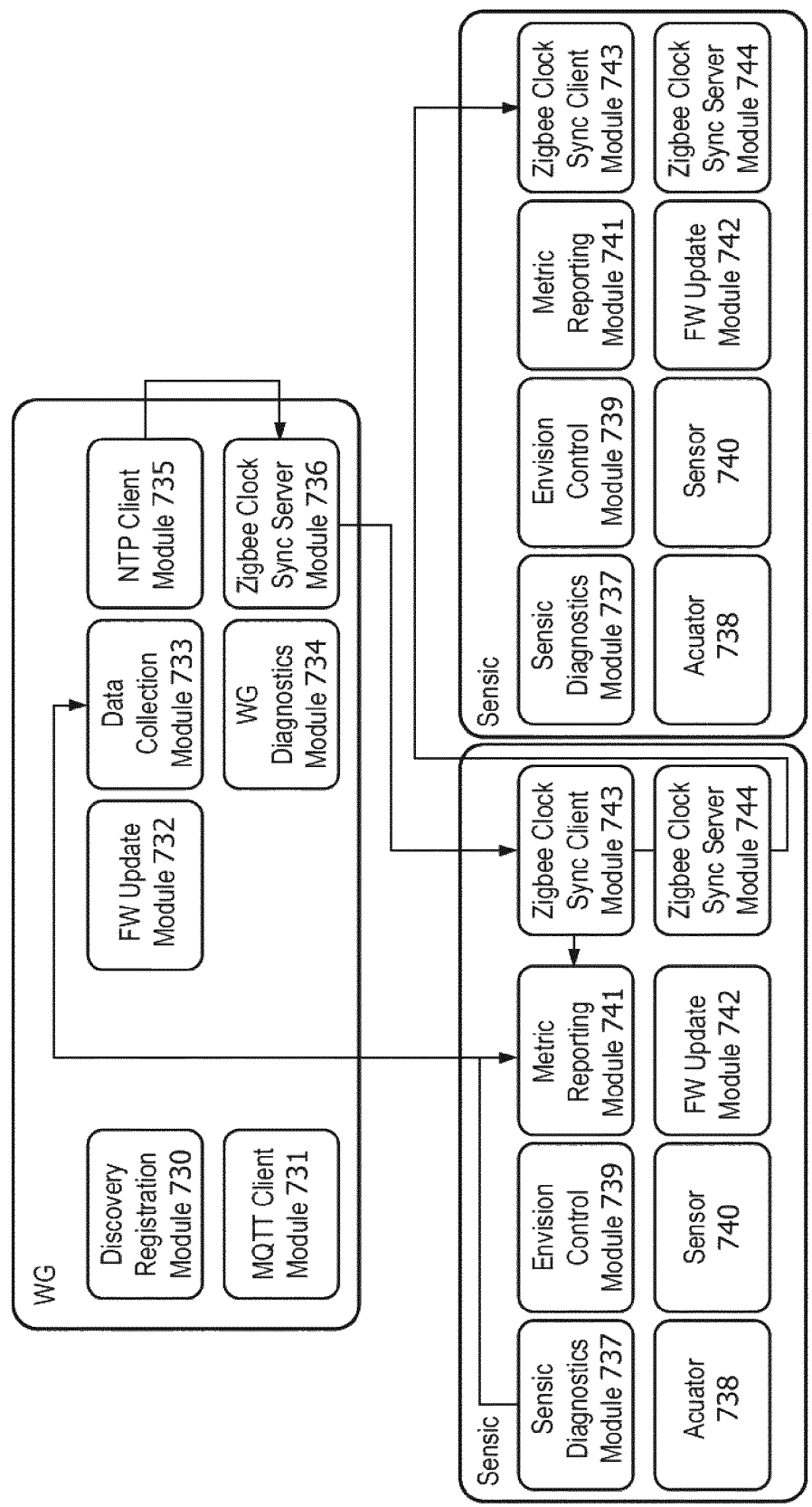

FIGS. 7A-C illustrate an embodiment of a deployment of the cloud-based system for monitoring and controlling physical environments depicted in FIG. 1. The cloud module illustrated in FIG. 7A is similar to Cloud 115 described in the context of FIG. 1. System Project Application Module 140, System Intake Application Module 130, System Map Application Module 160, System Operations Application Module 620, System Energy Application Module 120, Cloud Connectivity Service Module 190, Data Platform Module 180 and Projects 170A are similar to the identically-named modules depicted in FIGS. 1 and 6. Project Service Module 708 enables the various system application modules such as System Intake Application Module 130 and System Map Application Module 160 to support multiple communication protocols such as Dynet® and ZigBee®. It essentially allows the system application modules to perform their functions in a protocol-independent fashion. It also facilitates communication of data between the Projects 170A database and the system application modules.

The Envision Deployment Engine Module 711 participates in the generation of configuration files for system devices such as Sensic devices. These configuration files are applicable to individual Sensics or groups of Sensics and are used to control their behavior in response to events such as changes in ambient lighting, occupancy, time of day and the like. The Envision Plugin Module 709 is a plugin module that allows the Envision Deployment Engine Module 711 to communicate with the Project Service Module 708 in a seamless manner. In other words, because the plugin can communicate with both the Envision Deployment Engine Module 711 and the Project Service Module 708, the Project Service Module 708 can be implemented without any dependence on the implementation or architecture of the Envision Deployment Engine Module 711. The Envision Data Analytics Module 714 performs the necessary analytics on energy and resource usage information gathered from all the Sensic devices by way of the building servers and gateways, and makes the analyzed data available for presentation to the System Energy Application Module 120.

Overview of Registration, User Authentication and Device Authorization

Devices 701 depicted in FIG. 7A is a database module that is configured to hold information related to all the various building servers (e.g. Building Server 100), gateways (e.g. Gateway 110A), and system devices (e.g. System Device 101) that are associated with each project hierarchy. For example, before a particular building server is able to be utilized for resource and energy management purposes for a particular project or site, it will need to register itself with the cloud (e.g. Cloud 115). This registration process is described in further detail in the description accompanying FIGS. 8A-B. Information associated with registered users (e.g. user names, passwords, roles) of the cloud-based system of FIG. 1 are securely stored in the Users 702 database module depicted in FIG. 7A. In various embodiments, this information is accessed by the Identity Management Module 705 during the authentication process, when a user wishes to access, for example, one or more of the cloud-based system application modules (e.g. System Map Application Module 160). Standard authentication techniques may be employed by the Identity Management Module 705. In various embodiments, the Forgerock OpenAM/DJ Module 706 is responsible for ensuring appropriate authorization with respect to the identities for the various devices (e.g. building servers and wireless gateways) that seek access to the cloud to perform their part in an exemplary system for monitoring and controlling physical environments. In such embodiments, the Policy Agent Module 707 aides in granting authorization to users to access the various depicted system application modules. For example, even after a user has been properly authenticated and has gained access to the initial System Project Application Module 140, further access to the other system application modules such as System Intake Application Module 130 and System Map Application Module 130 are limited based on the role the user has been assigned. Roles have been described in further detail in the description associated with FIG. 6. In many embodiments, access policies associated with the various roles are configured/implemented via URLs. For example, assume that various aspects of the System Project Application Module 140 can be accessed each with a different URL. While a user who has been assigned an Administrator role may be granted the ability to access all of these different URLs (each allowing the user to access a variety of functionality provided by the System Project Application Module 140), a user who has been assigned an Installer role may only be granted access to two of these URLs. The Policy Agent Module 707 enforces preset and configurable policies with respect to the functionality that each role is able to access.

Firmware/Software Images and Updates

The FW Images 700 database module of FIG. 7A stores the images for updating the Building Server, Gateway and System device firmware and/or software. The FW/SW update process starts with a trigger from the cloud's SW Update Module 703 to the Building Server via the MQTT protocol. In various embodiments, the trigger may contain the URL for retrieving the necessary update image. In the case of a Building Server firmware update, the SW Update Module 703 in the cloud will send a trigger via MQTT, the FW Update BS Module 721 in the Building Server will recognize the trigger, and the Building Server will then use the URL in the trigger to retrieve the update image and report back to the cloud using the MQTT channel that it has finished downloading the update image. In these embodiments, the SW Update Module 703 in the cloud will thereafter send an explicit trigger via MQTT, and upon receiving the trigger, the Building Server will perform tasks required to switch to the new updated image (e.g. rebooting and switching to the application of the new image). The process for performing a firmware update of a Wireless Gateway is similar to the above-described firmware update for the Building Server. However, the update process for the Wireless Gateway uses the Building Server as a proxy. For example, the retrieval of the FW image via a URL by the Wireless Gateway is proxied via the HTTP Proxy Module 718 depicted in the Building Server module in the present figure.

The Building Server depicted in FIG. 7A is similar to Building Server 100 described in the context of FIG. 1. This embodiment of the Building Server depicts various modules that play role(s) in facilitating software updates, device registration, and data collection. The HTTP Proxy Module 718 and the MQTT Proxy Module 720 proxy communications using the HTTP and the MQTT protocols, respectively, between one or more wireless gateways and the cloud. For example, communications arising from the MQTT client in a wireless gateway associated with the Building Server of FIG. 7A is routed by the MQTT Proxy Module 720 of the Building Server. In many embodiments, only one device (e.g. a building server) within a physical environment that is being monitored will have direct access to the cloud that is being used to monitor the environment. All data from the various wireless gateways and system devices will be proxied through the Building Server. In such embodiments, the wireless gateway and system devices are cloud-independent. In other words, they do not need to have the data or logic to connect directly to the cloud. The Device Registration Module 716 orchestrates the registration of the Building Server with the Cloud. This process is described in more detail in the description accompanying FIGS. 8A-B. The Field Network Discovery Module 717 is involved in the process of discovering devices in the network. The Network Provider Module 719 receives configuration data from the Envision Plugin Module 709 in the Cloud and is responsible for forwarding this data to the System devices (e.g. Sensic devices). Additionally, the Network Provider Module 719 facilitates bi-directional communication between the Cloud and the Wireless Gateway. For example, it can send sign-on messages originating in the Sensics, Wireless Gateway and Building Server to the Cloud via the Envision Plugin Module 709. Similarly, the Network Provider Module 719 can also propagate commands from the Cloud (e.g. open ZigBee network commands) to the Wireless Gateway.

The Failover Module 726 and Recovery Module 728 are together responsible for detecting and recovering from errors in the Building Server's operations. In some embodiments, the operation of one or more key software processes is continually monitored by way of a timer. In the case that the process(es) stop due to an error condition, the timer also stops. The timer stopping is a trigger that results in the one or more processes or the Building Server itself restarting to recover from the error condition. The BS Diagnostics Module 727 gathers information on the routine operation of the Building Server. For example, in many embodiments, error messages that may help in diagnosing operating errors are collected. These messages are periodically sent to the Cloud for analysis and visualization by system application modules such as System Energy Application Module 120. The Scheduling Module 729 in the Building Server is involved in scheduling tasks that override the usual behavior in a physical environment (e.g. building) that are based on events such as changes in occupancy or daylight. In some embodiments, the Scheduling Module 729 is executed in the Building Server, whereas in others, it is executed in the Cloud.

The Gateway (e.g. a wireless gateway) depicted in FIGS. 7B and 7C is similar to Gateways 110A and 110B previously described in the context of FIG. 1. FIGS. 7B and 7C depict various modules of the Wireless Gateway. As with most modules described throughout this Specification, these modules may be implemented in firmware or entirely in software. If implemented entirely in software, they may be executed on one or more processor located physically at the Wireless Gateway itself or on one or more processors located remotely, but accessible to the Wireless Gateway. The NTP Client Module 735 of the Wireless Gateway is similar to the similarly named module in the Building Server, in that it participates in pushing time data to the System devices such as Sensics. The ZigBee Clock Sync Server Module 736 of the Wireless Gateway also participates in this time-synchronization-related process, and its participation, along with the Wireless Gateway's NTP Client Module 735 is described in more detail in the next section on time synchronization. The Data Collection Module 733 of the Wireless Gateway is involved in the collection of energy and other metrics from the System devices (e.g. Sensics) and pushing this information upward to the Cloud by way of the Building Server. Details regarding its functionality are described in the following section on metric reporting. In various embodiments, the WG Diagnostics Module 734 is primarily responsible for reporting error or otherwise abnormal conditions or states encountered during the routine operation of the Wireless Gateway. These error conditions or states are thereafter reported up to the Cloud via the Building Server for further analysis and presentation. The FW Update Module 732 of the Wireless Gateway, like the similarly named module on the Building Server, is primarily responsible for coordinating the firmware and software updates for itself and for Sensic devices. This process is described in further detail in the context of the FIG. 9. The Discovery Registration Module 730 of the Wireless Gateway functions to register itself with the Building Server and/or the Cloud. The MQTT Client Module 731 works to route communications based on the MQTT protocol arising from the Wireless Gateway, and any device in communication with the Wireless Gateway, to the Building Server via the Building Server's MQTT Proxy Module 720.

The Sensics depicted in FIG. 7C are similar to the devices 101-106 described in the context of FIG. 1. In various embodiments, the Sensic Diagnostics Module 737 reports error states and conditions associated with the usual operation of the Sensic to the Metric Reporting module, which is described in the following section on time synchronization. The ZigBee Clock Sync Client Module 743 and ZigBee Clock Sync Server Module 744 are also described in the following section on time synchronization. In such and other embodiments, the FW Update Module 742 participates in the process of updating the Sensic's firmware and/or software, and this process is discussed in more detail in the description accompanying FIG. 9. The Sensor 740 senses, for example, infrared signals, changes in motion or light intensity. The Actuator 738 actuates devices, such as luminaires, to change, for example, the intensity or other characteristics associated with illumination. It may also actuate a variety of other devices found in buildings, such as HVAC devices, blinds, curtains, projectors, displays, and the like. The Envision Control Module 739, according to many embodiments, functions to apply configuration data (e.g. configuration files) passed down to the Sensic from the Envision Deployment Engine Module 711 and Envision Plugin Module 709 in the Cloud via the Building Server and the Gateway. In such embodiments, the configuration file details the response of the particular Sensic or a group of Sensics to various lighting and environmental conditions such as changes in occupancy, temperature or movement.

Time Synchronization

In many embodiments, the NTP Client Module 723 depicted as part of the Building Server in 7A is used for time synchronization purposes. It works in conjunction with an NTP Server Module 715 on a network such as the Internet, an NTP Server Module 725 that is also part of the Building Server depicted in FIG. 7A, and the NTP Client Module 735 and ZigBee Clock Sync Server Module 736 depicted as part of the Wireless Gateway WG in FIG. 7B. NTP generally refers to the known Network Time Protocol, which is a networking protocol commonly used for clock synchronization between computer systems. NTP typically works to synchronize computing devices to be within a few milliseconds of a Coordinated Universal Time (UTC). While NTP may operate under the Client-Server model, it can also be used in peer-to-peer solutions, where multiple devices may be considered a potential time source.

In many embodiments, in order to accurately timestamp energy and resource usage data collected from the Sensics, it is essential to periodically synchronize all the Sensics, Wireless Gateways and the Building Server. The current time data is first retrieved from the NTP Server Module 715 depicted as being outside of the Cloud or Building Server. Generally such an NTP Server is on the Internet. In various embodiments, the Building Server's NTP Client Module 723 receives the current time data. Next, this current time data is received by the NP Server Module 725 in the Building Server, before it is communicated to the NTP Client Module 735 of the Wireless Gateway depicted in FIG. 7B. Within the Wireless Gateway, this current time data is in turn communicated to the ZigBee Clock Sync Server Module 736. Thereafter, a level discovery phase is initiated to identify those Sensic devices that are closest to the Wireless Gateway. In many embodiments, this is accomplished by the Wireless Gateway sending a broadcast command via ZigBee with a particular level (e.g. a level 0 associated with itself). When Sensic devices closest to the Wireless Gateway receive the broadcast command, they increase their own level to 1 and then re-broadcast the same or a similar message with a level 1. Sensic devices receiving the re-broadcast message will thereafter identify themselves with a level 2 and re-broadcast the message again. This process continues until all neighborhood Sensic devices have been identified and are associated with a level. The second phase following the level discovery phase is a synchronization phase, which involves using a known pair-wise time synchronization algorithm. As part of the synchronization process, the ZigBee Clock Sync Client Module 743 of one of more Sensics at a first level receives the current time data from the ZigBee Clock Sync Server Module 736 of the Wireless Gateway. This information is then propagated peer-to-peer by the Sensics themselves. This may be a result of the ZigBee Clock Sync Server Module 744 of a particular Sensic communicating this information via the ZigBee network for reception by the ZigBee Clock Sync Client Module 743 in a neighboring Sensic, as indicated in FIG. 7C with the arrow lines.

Metric Reporting

In various embodiments, Sensics will report energy and/or occupancy data periodically (e.g. energy data may be reported every fifteen minutes and occupancy data every fifty seconds). The Metric Reporting Module 741, shown in FIG. 7C as part of each Sensic, receives time data from the ZigBee Clock Sync Client Module 743, which is then added as a time stamp to the reported energy or resource usage data. The Sensic Diagnostics Module 737 also provides the Metric Reporting Module 741 with diagnostic data regarding the operation of the Sensic itself. This diagnostic data may be error messages indicating potential or known issues with the routine operation of the Sensic, such as the inability to sense or actuate in the usual manner. In many embodiments, metric data is transmitted from each Sensic in the following manner. First, there are a few different packet types that are utilized: a packet type for transmitting address information, another for transmitting the full time stamp with a first metric, and yet another for transmitting a time offset with a further metric. In a typical embodiment, when the Metric Reporting Module 741 of a Sensic reports, for example, metric related to energy usage, it first transmits a first message with the address information needed to identify the Sensic device from which the metric originates. Thereafter, the full time stamp with a first metric relating to energy usage is transmitted. Lastly, a second metric relating to energy usage is transmitted along with time offset data indicating the amount of time that has elapsed since the transmission of the first metric. The metric data is received by the Data Collection Module 733 of the Wireless Gateway In some embodiments, the Sensic does not itself provide any address information that uniquely identifies itself to the Wireless Gateway when reporting metric data. In such embodiments, the Data Collection Module 733 in the Wireless Gateway (depicted in FIGS. 7B and 7C) appends or otherwise associates a globally unique address for the Sensic to its reported metric. The Data Collection Module 733 in the Wireless Gateway may also add its own address information. In various embodiments, this combination of the Wireless Gateway's address information and an address associated with a particular Sensic or group of Sensic is what results in the globally unique nature of the address associated with a particular metric or collection of metrics being reported. The Data Collection Module 733 in the Wireless Gateway receives information from the Sensics typically using the ZigBee protocol, but provides information to the Building Server typically using HTTPS.

Periodically, the Wireless Gateway's Data Collection Module 733 transmits data to the Data Collection Module 724 in the Building Server. In various embodiments, the Wireless Gateway pushes this information periodically. In other embodiments, the Building Server pulls this information from the Wireless Gateway. After receiving the metric data, the Data Collection Module 724 of the Building Server adds its own address to the address information. This address information may be added to each received metric received from the Wireless Gateway, or collectively to a whole batch of metrics prior to transmitting the batch of metrics to the Cloud. In many embodiments, the Building Server collects all the received metrics for a short period of time (e.g. 5 seconds) prior to batch transmitting the metrics to the Cloud's Data Platform Module 180. In such embodiments, should there be a lack of connectivity with the Cloud for a period of time, the metric data received from all the Wireless Gateways associated with the Building Server will be buffered for a maximum duration of time (e.g. 24 hours). When connectivity with the Cloud is re-established, the Building Server will push the buffered metric data to the Cloud. In many embodiments, such buffering is also available at the Wireless Gateway to prevent data loss if connectivity between the Wireless Gateway and the Building Server is disrupted.

Building Server Registration and Connection

Figure 8A:
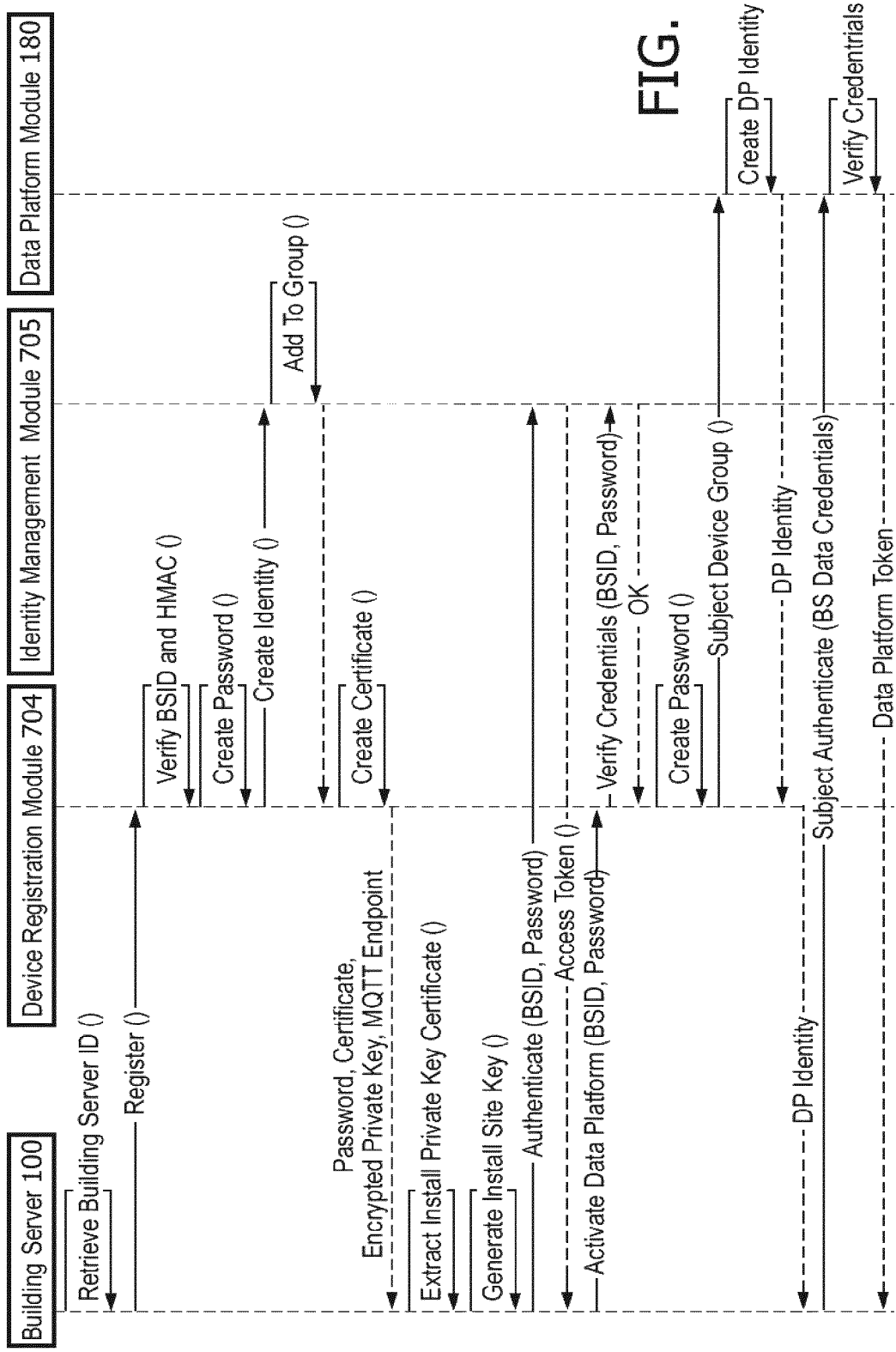
FIGS. 8A and 8B illustrate an embodiment of a method of registering and connecting a Building Server with the exemplary cloud-based system for monitoring and controlling physical environments.
Figure 8B:
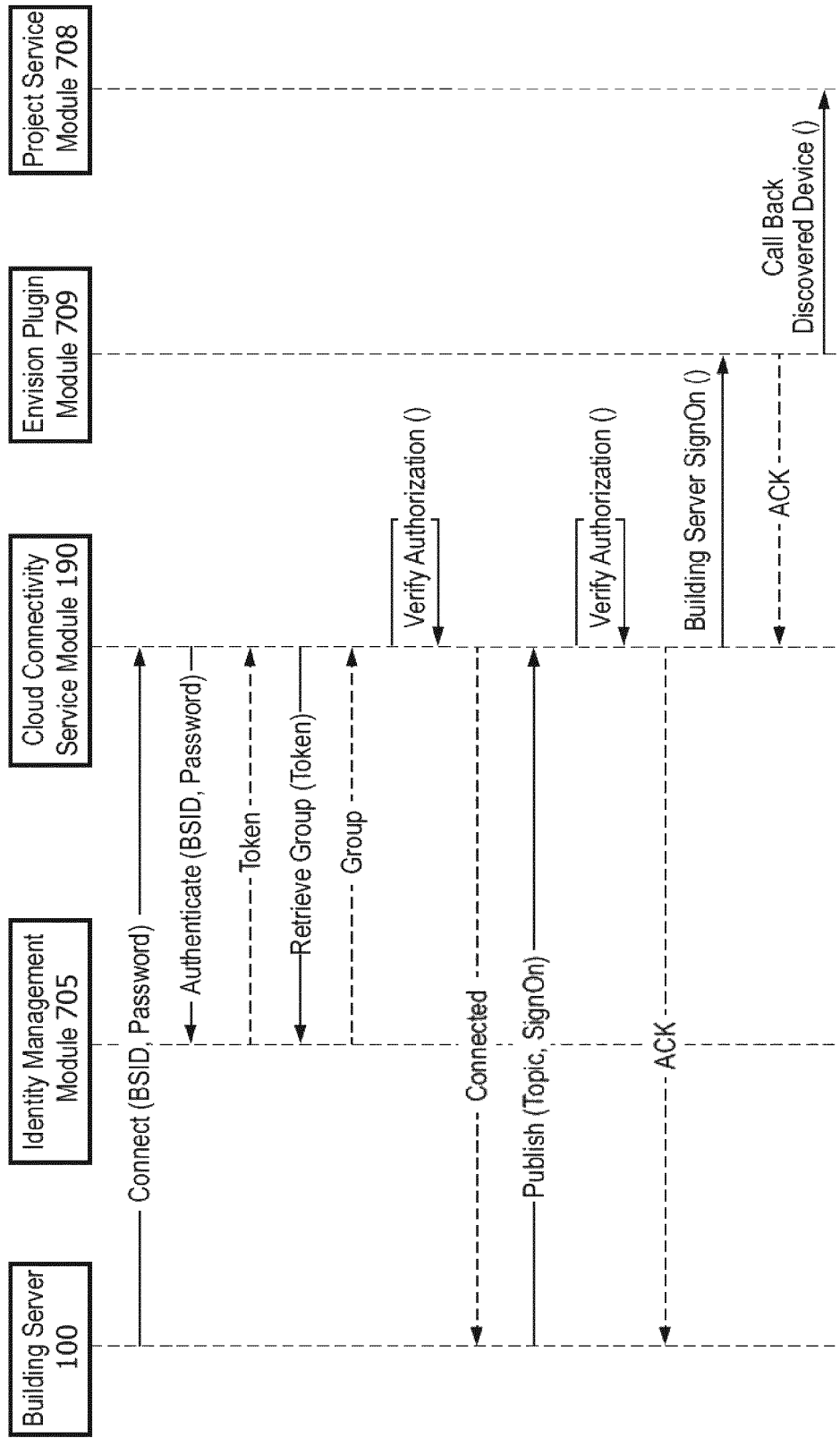

FIGS. 8A and 8B illustrate an embodiment of a method of registering and connecting a Building Server with a Cloud (e.g. Cloud 115 of FIG. 1) of a cloud-based system for monitoring and controlling a physical environment. The boxes at the top of both figures represent a Building Server inside a facility (e.g. Building Server 100 of FIG. 1), and various cloud-based modules associated, for example, with Cloud 115 of FIG. 1. Device Registration Module 704, Identity Management Module 705, Data Platform Module 180 are all embodiments of identically named cloud-based modules previously described in the context of FIG. 7A.

As depicted in FIG. 8A, the Building Server 100 retrieves a locally saved MAC address that identifies the building server uniquely across of all vendors of building servers (Retrieve Building Server ID( )). Thereafter, Building Server 100 initiates, for example, a device-to-service communication (Register ( )) by way, for example, of an API call. In many embodiments, the Device Registration Module 704 in the Cloud (e.g. Cloud 115) essentially exposes an API that Building Server 100 invokes to begin the registration process. In various embodiments, to register itself with the Cloud, Building Server 100 communicates its retrieved Building Server ID (e.g. a 64 bit MAC address), a device type indicating that it is a Building Server, and a keyed-hash message authentication code (HMAC). HMAC is a known cryptographic message authentication code that uses a hash function in combination with a secret key. It is used to verify both message authentication and data integrity. An HMAC may be calculated using any known cryptographic hash function, such as MD5 or SHA-1. In various embodiments, the Device Registration Module 704 has access to a database that stores a secret cryptographic key for each building server. Each building server in turn has access to its own copy of the secret cryptographic key, but not the cryptographic keys of any other building server. The Device Registration Module 704 on the Cloud thereafter verifies that the received Building Server ID and HMAC are associated with each other (Verify BSID and HMAC( )). In doing so, the Device Registration Module 704 authenticates Building Server 100. If, during this process, the Device Registration Module 704 receives multiple registration attempts from a building server that it is unable to verify/authenticate, then it may temporary block such attempts from the building server.

Next, the Device Registration Module 704 creates a password (Create Password ( )) that, in combination with the Building Server ID will act as the building server's operational ID when interacting with various cloud-based modules. In many embodiments, the Device Registration Module 704 then invokes the Identity Management Module 705 to have it create a new identity (Create Identity( )) that represents Building Server 100 within the cloud-based system for monitoring indoor space and resource usage. The Building Server ID and password are used to formulate the new identity. Once the new identity for Building Server 100 has been successfully created, the Identity Management Module 705 proceeds to add Building Server 100 to a group of building servers recognized by the Cloud (Add To Group( )). This may be accomplished by simply creating an association in a database between the Building Server ID and the building server's newly minted identity and a predefined group. In some embodiments of the Cloud, each building server registered with the Cloud belongs to a group that may be referred to as the Building Service group. Belonging to this group is one way of identifying a device as a special type of device, namely a Building Server. Following successful addition to the group, the Identity Management Module 705 notifies the Device Registration Module 704 of successful completion (depicted by the dotted arrow from Identity Management module 705 to Device Registration Module 704).

Thereafter, the Device Registration Module 704 creates a cryptographic Certificate for the Building Server 100 to use in order to function as a secure server. There are various ways for such a cryptographic Certificate to be created. Typically, the Certificate is a public key that is signed and encrypted using a private key of a Certificate Authority. The user of the Certificate (e.g. Building Server 100) can present the public key to other entities as evidence of its authenticity—thereby preventing an entity from impersonating another. In various embodiments, the Device Registration Module 704 then sends the password it previously generated for Building Server 100, the created Certificate, the encrypted private key, and information on a resource (e.g. an MQTT endpoint or URL) that Building Server 100 can use to communicate with the Cloud, to Building Server 100 (depicted by the dotted arrow from Device Registration Module 704 to Building Server 100).

Upon receipt of the above-identified pieces of information from the Device Registration Module 704, Building Server 100 decrypts the encrypted private key (Extract Install Private Key Certificate( )), using, for example, it's secret key that it already shares with the Device Registration Module 704. For secure communications within the building itself (e.g. between Building Server 100 and various wireless gateways), a shared secret may be used to ensure secure connections between these devices. Building Server 100 generates a Site Key as such a shared secret for use within the building (Generate Install Site Key( )).

Next, Building Server 100 attempts to have itself authenticated by the Identity Management Module 705, by, for example, providing its Building Server ID and the password it received from the Device Registration Module 704 (Authenticate (BSID, Password)). If the authentication is successful, Identity Management Module 705 returns an access token that Building Server 100 may use to subsequently access services in the Cloud (depicted by the dotted arrow labeled 'Access Token').

In many embodiments, to access the Data Platform Module 180 associated with the Cloud, Building Server 100 is required to have a second set of access credentials. This essentially separates the security related to gaining access to all the other cloud modules from the security associated with access to the Cloud's data platform itself. The following discussion deals with the part of Building Server 100's registration process that will result in granting this additional set of credentials. To initiate this process, the Building Server invokes, for example, an API call (Activate Data Platform (BSID, Password)) and provides its Building Server ID as well as its password. This communication may occur over HTTPS. Upon receipt of this communication, the Device Registration Module 704 invokes the Identity Management Module 705 to verify the supplied credentials (Verify CredentialsCredentials (BSID, Password)). Once verified (dotted arrow from Identity Management Module 705 to Device Registration Module 704 labeled OK), the Device Registration Module 704 proceeds to generate another password for Building Server 100 to use (Create Password ( )) for its communications with Data Platform Module 180. In many embodiments, the Device Registration Module 704 then provides the Data Platform Module 180 with the following information: the Building Server ID, the new password for data platform access, and information on the particular group that Building Server 100 belongs to (Subject Device Group ( )). In many embodiments this communication may be accomplished via HTTPS. Using this information, the Data Platform Module 180 creates a unique identity for use in identifying Building Server 100 in its future interactions with the building server (Create DP Identity ( )). Upon successfully creating this new identity, the Data Platform Module 180 notifies the Device Registration Module 704 of the same (dotted arrow from Data Platform Module 180 to Device Registration Module 704 labeled DP Identity). The Device Registration Module 704 in turn passes on this notification of success to Building Server 100 along with the newly generated data platform credentials of the building server (dotted arrow from Device Registration Module 704 to Building Server 100 labeled DP Identity).

Thereafter, in many instances, Building Server 100 may attempt to get itself authenticated directly with Data Platform Module 180 by invoking, for example, API for this purpose at the Data Platform Module 180 (Subject Authenticate (BS Data Credentials)). In other instances, however, the steps of the Building Server 100 getting itself directly authenticated by the Data Platform Module 180 may not be necessary. In the former instances, the Building Server 100 supplies the Data Platform Module 180 with its Building Server ID and the password created by Data Platform Module 180. In turn, Data Platform Module 180 verifies the credentials supplied by Building Server 100 (Verify Credentials( )) and returns an access token for use by Building Server 100 in future communications with Data Platform Module 180 (dotted arrow from Data Platform Module 180 to Building Server 100 labeled Data Platform Token).

As depicted in FIG. 8B, after registration, Building Server 100 connects to the Cloud for the first time by, for example, invoking a method of the Cloud Connectivity Service Module 190 using an API it provides, and supplying its Building Server ID and the password initially created for Building Server 100 by the Device Registration Module 704 (Connect (BSID, Password)). In response, the Cloud Connectivity Service Module 190 invokes an authenticate method, whereby the Identity Management Module 705 is asked to authenticate the Building Server's credentials. The Building Server ID and Password provided by Building Server 100 are used for this purpose (Authenticate (BSID, Password)). In many embodiments, the authentication process may be initiated by the Cloud Connectivity Service Module 190 at the Identity Management Module 705 using the HTTPS protocol. Upon successful authentication, the Identity Management Module 705 returns a token to the Cloud Connectivity Service Module 190 indicating that Building Server 100 has been successfully authenticated (depicted by dotted arrow labeled 'Token'). Using the received Token, the Cloud Connectivity Service Module 190 then requests that the Identity Management Module 705 retrieve the Group that Building Server 100 was previously assigned to (Retrieve Group (Token)). In response, the Identity Management Module 705 returns a reference to the Group that Building Server 100 is assigned to (e.g. a Group that contains references to all the registered building servers associated with the particular Cloud).

In various embodiments, all of the above information exchanges may be carried out using the HTTPS protocol. Using the reference to the Group assigned to Building Server 100, the Cloud Connectivity Service Module 190 can verify the authorization of Building Server 100 (Verify AuthorizationAuthorization ( )). To do this, in various embodiments, the Cloud Connectivity Service Module 190 checks to see Building Server 100 belongs to the correct authorization group. System devices like building servers and gateways are usually associated with a Devices group. As a result, when any device connects to the Cloud Connectivity Service Module 190 using MQTT, the Cloud Connectivity Service Module 190 checks to see if the device is, in fact, part of the Devices group. In many embodiments, only devices or services (e.g. the Envision Protocol Plugin), but not users, are allowed to connect to the Cloud via MQTT. Once Building Server 100's authorization status has been successfully verified, the Cloud Connectivity Service Module 190 sends a notification back to Building Server 100 (using, for example, MQTT) indicating that it is successfully connected (depicted by dotted arrow from Cloud Connectivity Service Module 190 to Building Server 100 labeled 'Connected'). Building Server 100 can thereafter publish a "Sign On" message via the Cloud Connectivity Service Module 190 using, for example, the "Publish" mechanism of MQTT. The "Sign On" message is published to a particular Topic associated with the particular Building Server. In MQTT, different topics are associated with different channels or functionalities. Various devices can subscribe to various channels in order to receive published messages on those channels. Accordingly, all devices subscribing to the particular Topic will receive notification of Building Server 100's "Sign On" message. Prior to acknowledging Building Server 100's wish to Publish its "Sign On" message, however, the Cloud Connectivity Service Module 190 again performs an Authorization Verification (Verify Authorization ( )) as it had previously performed following Building Server 100's Connect invocation. Following successful authorization verification, an acknowledgment is returned to Building Server 100 (depicted by dotted arrow from Cloud Connectivity Service Module 190 to Building Server 100 labeled 'ACK'). Thereafter, the Cloud Connectivity Service Module 190 pushes Building Server 100's Sign On message (Building Server SignOn ( )) to all subscribers of the Topic that Building Server 100 wishes to publish its Sign On message to. As a subscriber, the Envision Plugin Module 709 receives the Sign On message and acknowledges receipt (depicted by dotted arrow from Envision Plugin Module 709 to Cloud Connectivity Service Module 190 labeled 'ACK'). Upon receiving Building Server 100's Sign On, the Envision Plugin Module 709 promptly reports the same to the Project Service Module 708, so that it is aware of a new device signing on, and can take any necessary actions (Call Back Discovered Device ( )).

Updating the Software or Firmware of a System Device

Figure 9:
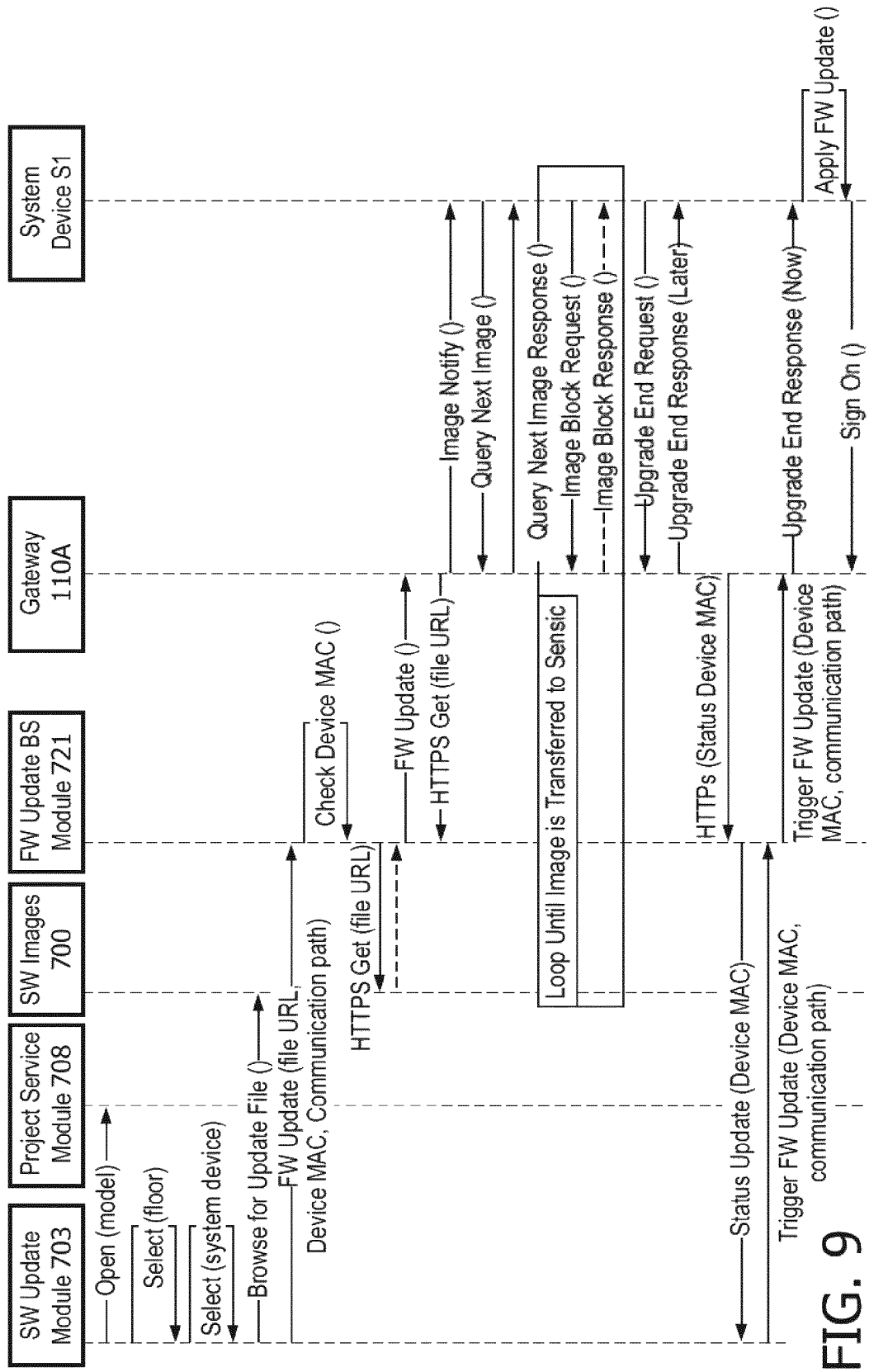
FIG. 9 illustrates an embodiment of a method of updating the software or firmware of a System device such as a Sensic device in the exemplary cloud-based system for monitoring and controlling physical environments.

FIG. 9 illustrates an embodiment of a method of updating the software or firmware of a System device such as a Sensic device (e.g. Device 101 of FIG. 1). The arrows shown in the FIG. 9 could represent function calls, commands, or any other mechanism for invoking action or response from an executing piece of software or firmware on the same or a different, but accessible processor. In the description below, HTTPS is sometimes referred to as the communication protocol between, for example, the Building Server and the Gateway, or the Building Server and the Cloud. However, HTTPS is one of many protocols that may be used in any embodiment. For example, MQTT may also be applicable for these communications. Of the modules illustrated at the top of the figure, three in particular, SW Update Module 703, Project Service Module 708, and SW Images 700 are software modules that reside in a cloud, such as Cloud 115 of FIG. 1 or the Cloud of FIG. 7A. Project Service Module 708 depicted here is similar to the Project Service Module 708 depicted in FIG. 7A. The remaining three modules or devices illustrated at the top of this figure, namely, FW Update BS Module 721, Gateway 110A and System Device 101 represent physical devices or modules executing on processors associated with physical devices that are located within a physical structure such as a building. The SW Update Module 703 first executes an "Open" command or function call on the Project Service Module 708. In various embodiments, the SW Update Module 703 wishes to open a particular pre-existing project hierarchy. Project hierarchies have been previously discussed in the context of FIGS. 5A-C and 6. In response, a logical model of the particular project is returned, using which the SW Update Module 703 gains access to data associated with a particular floor (Select (floor)) and data associated with one or more system devices (e.g. sensic devices) on the particular floor (Select (System device)).

The Browse for Update File( ) arrow indicates that the SW Update Module 703 requests or otherwise retrieves from the SW Images 700 repository, the URL of an update file related to the system device that the SW Update Module 703 previously selected. The SW Update Module 703 thereafter sends to the Building Server's FW Update BS Module 721, a FW Update message (FW Update (file URL, Device MAC, Communication path)) with one or more of the URL of the system device's update file, a Device MAC and a communication path. In cases where the device to be updated is the Building Server itself, the communication path may be empty. If a Gateway (e.g. a wireless gateway) is to be updated, the communication path is the IP address of the Gateway. And if a system device is to be updated, the communication path is the IP address of a Wireless Gateway and/or a ZigBee short address. In various embodiments, the FW Update (file URL, Device MAC, Communication path) arrow will bypass the FW Update BS Module 721 completely and proceed to invoke the Gateway's FW Update Module 732 directly, at least in the case of updates for system devices such as Sensic devices. In the present case (e.g. the embodiment of the method depicted in FIG. 9), the Building Server's FW Update BS Module 721 checks (Check Device MAC ( )) to determine if the Device MAC supplied by the SW Update Module 703 belongs to a building server (e.g. itself). If it doesn't, it initiates the retrieval of the update file for the device associated with the Device MAC. The HTTPS GET (file URL) arrow indicates the FW Update BS Module 721 using the HTTPS protocol to retrieve the appropriate update file using the file URL previously received from the SW Update Module 703.

Next, in an embodiment where the Building Server's FW Update BS Module 721 has retrieved the update file for the Sensic device to be updated, the Building Server's FW Update BS Module 721 notifies (FW Update ( )) the appropriate Wireless Gateway (e.g. one associated with the Sensic device to be updated), with a file URL of the update file. The Device MAC and communication path may also be relayed to the Wireless Gateway at this time. In response, the Wireless Gateway retrieves the update file from the Building Server using the conveyed file URL (HTTPS Get (file URL)). In alternative embodiments, the Wireless Gateway itself may implement an HTTPS server, rather than having to query the Building Server for this information. The Wireless Gateway may also poll the Building Server for new updates periodically. Additionally, the Wireless Gateway may implement a TLS server socket.

The Image Notify ( ) arrow is a trigger that the Wireless Gateway sends to the particular Sensic needing an update that there is a new update available. The Query Next Images ( ) arrow arising out of the Sensic (System Device 101) is a response to the trigger from the Sensic, essentially inquiring about details associated with the new update. The Query Next Image Response ( ) arrow arising out of the Wireless Gateway is a response to this query. This response may contain information related to the update, such as versioning information (e.g. major and minor version numbers) and hardware IDs. These queries and responses are, in many embodiments, conducted using the ZigBee protocol.

At this point, a loop of requests and responses are performed until the whole of image associated with the Sensic's update file has been transferred to the Sensic itself. The loop begins with the Sensic requesting an image block from the Wireless Gateway (Image Block Request ( )). In response, the Wireless Gateway responds with the requested Image Block (Image Block Response ( )). The loop terminates once all the image blocks in the update image file have been received by the Sensic device.

According to many embodiments, following the transfer of all the update file image blocks, the Sensic device requests further instructions on proceeding from the Wireless Gateway, by, for example, invoking the Upgrade End Request ( ) method. In some embodiments, the Wireless Gateway may respond to the Sensic by indicating that it should not refrain from starting the software/firmware update until further notice (Update End Response ( )). This Upgrade End Request/Response communication is usually accomplished using the ZigBee protocol, but is not necessarily limited to it. Next, the Wireless Gateway invokes a method to notify the Building Server's FW Update BS Module 721 of a new status associated with the Sensic Device (HTTPS (Status, Device MAC)). Upon receipt of this notice, the Building Server's FW Update BS Module 721, in turn, notifies the SW Update Module 703 on the Cloud that a Sensic device associated with a particular MAC address is ready for an Update (Status Update (Device MAC)). In response, the SW Update Module 703 may invoke a method at the Building Server's FW Update BS Module 721 to trigger the initiation of the update at the Sensic device (Trigger FW Update (Device MAC, communication path)). This trigger may communicate the Sensic device's MAC address and/or the communication path of the Sensic device. In many embodiments, the Building Server's FW Update BS Module 721 in turn notifies the Wireless Gateway of the update trigger using a similar mechanism (Trigger FW Update (Device MAC, communication path)). In response to this notification, the Wireless Gateway notifies the Sensic Device identified by the MAC device address and/or communication path that it may now begin applying the update (Update End Response(Now)). The Sensic thereafter applies the update using the image blocks of the update previously received (Apply FW Update( )). After the Sensic has finished installing the update and has performed other necessary tasks, like successfully rebooting, it indicates to the Wireless Gateway that it is now ready to sign on and resume usual operations (Sign On( )).

Building Server Localization

Figure 10A:
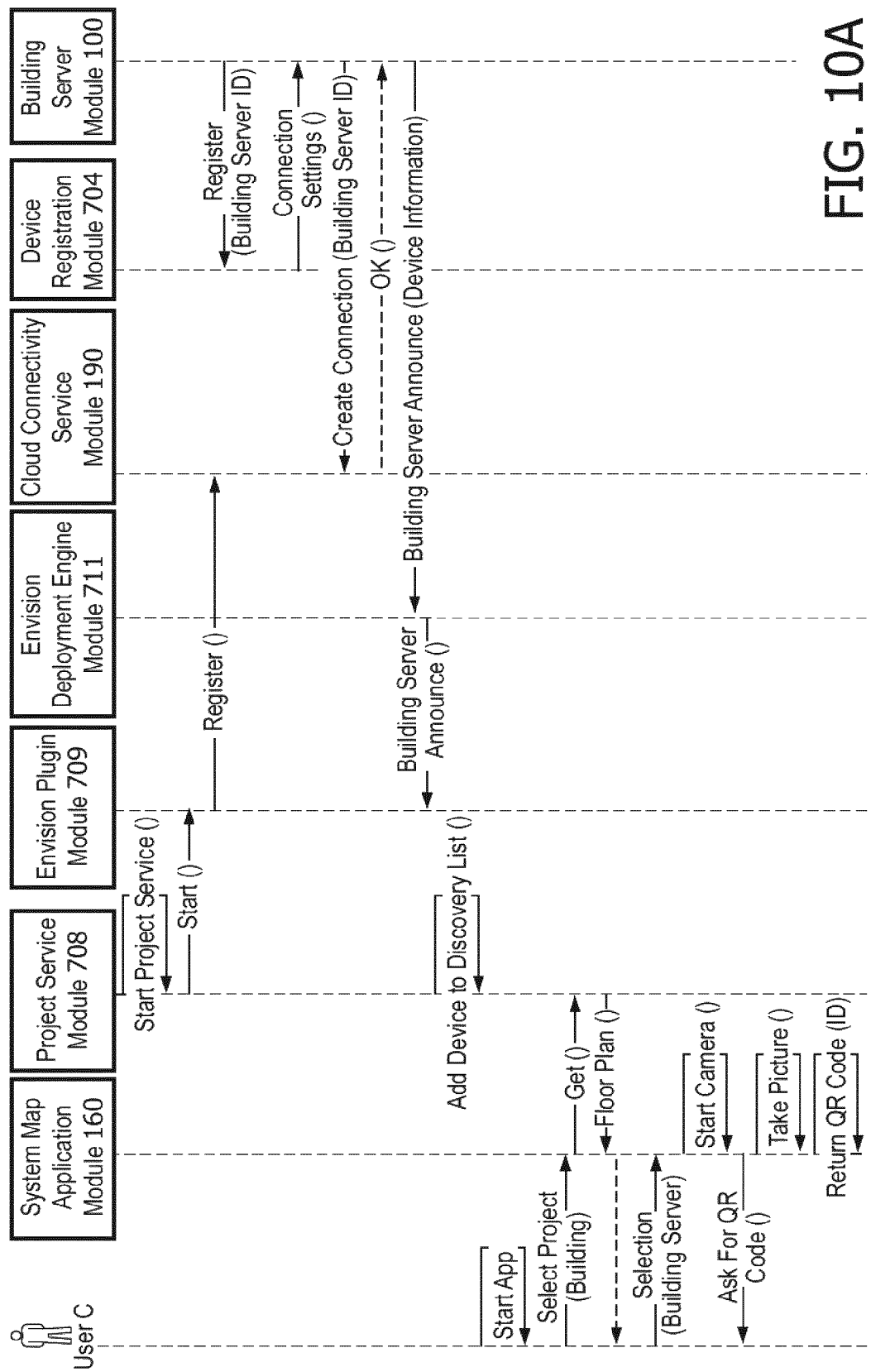
FIGS. 10A and 10B illustrate embodiments of a method of localizing a Building Server at an exemplary cloud-based system for monitoring and controlling physical environments.
Figure 10B:
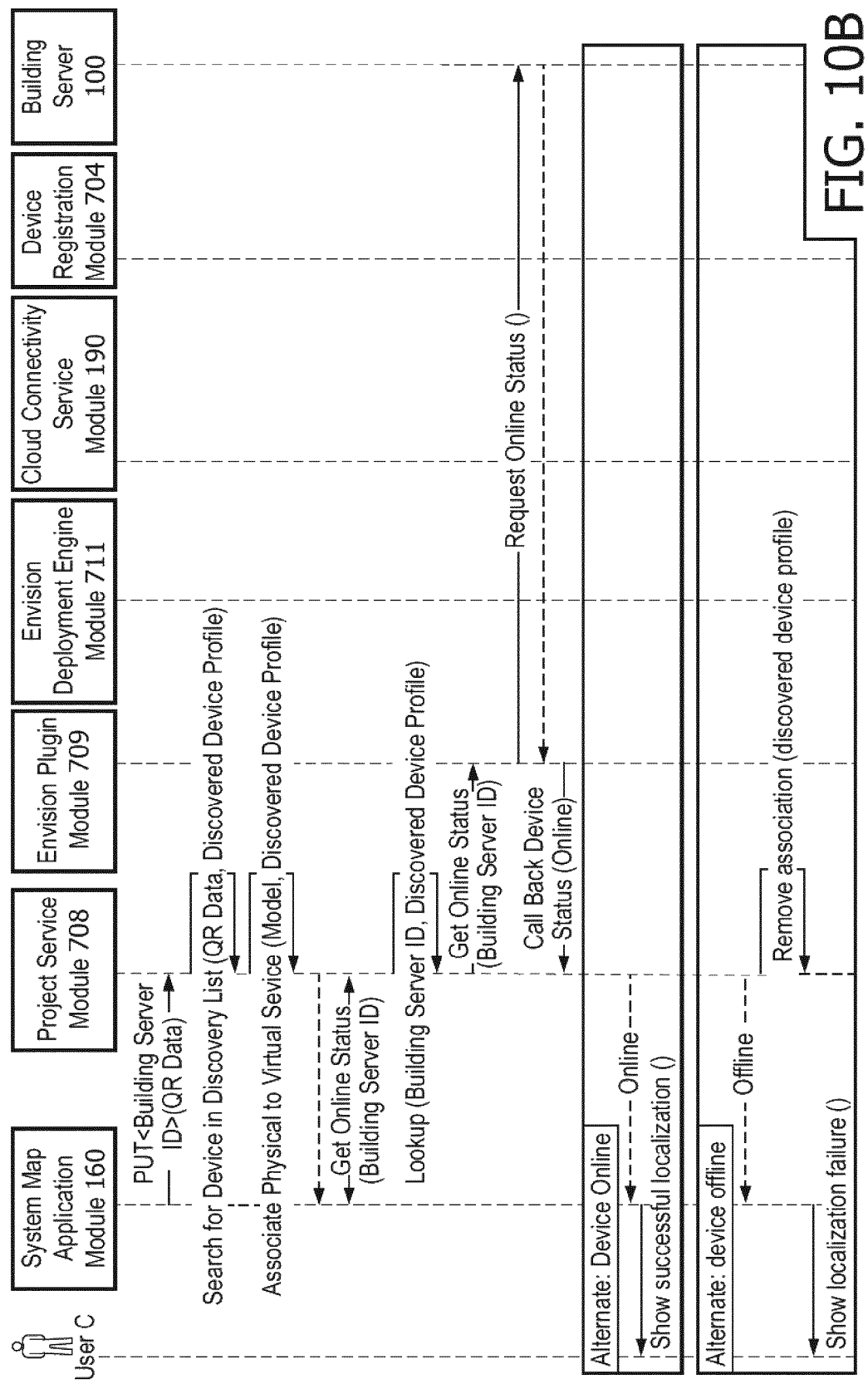

FIGS. 10A and 10B together illustrate an embodiment of a method of localizing a Building Server at the exemplary cloud-based system for monitoring and controlling physical environments. The boxes at the top of both figures represent a Building Server 100 inside a facility (e.g. Building Server 100 of FIG. 1), and various cloud-based modules associated, for example, with Cloud 115 of FIG. 1. Project Service Module 708, Envision Plugin Module 709, Envision Deployment Engine Module 711, Cloud Connectivity Service Module 190, and Device Registration Module 704 are all embodiments of identically named cloud-based modules previously described in the context of FIG. 7A. Additionally, System Map Application Module 160 is a cloud-based application module previously described in the context of FIGS. 1 and 6. User C, depicted on the left of FIG. 10A was also previously described in the context of FIG. 6. Essentially, User C is a person, such as an installer or commissioning engineer, whose main task may be to physically and logically install devices within a building based on a created digital model of a building. User C or some other similarly credentialed user can thereafter participate in the commissioning, configuration and deployment processes.

The presently depicted embodiment begins with the Project Service Module 708 in the Cloud self-starting (Start Project Service ( )), and invoking an instance of the Envision Plugin Module 709 (Start ( )). Once executing, the instance of the Envision Plugin Module 709 registers itself with the Cloud Connectivity Service Module 190 (Register ( )). In the meantime, the Building Server 100 in a building to be monitored registers itself with the Device Registration Module 704. The Building Server 100's registration process has been described in more detail in the description accompanying FIGS. 8A and 8B. One of the initial steps in the registration process involves the Building Server 100 invoking an API call (Register ( )) at the Device Registration Module 704, and providing its locally stored Building Server ID, which is, in various embodiments, a MAC address. The Device Registration Module 704, upon successful registration, returns an address/location at which the Building Server 100 can continue further communications with the Cloud, and the credentials that the Building Server 100 is required to present to access various services offered by the Cloud (Connection Settings( )). These credentials are typically issued per Building Server instance. Using the received connection settings and its Building Server ID, the Building Server 100 next initiates the creation of a secure connection by contacting the Cloud Connectivity Service Module 190 at the address/location provided by the Device Registration Module 704 (Create Connection (Building Server ID)). Upon successful setup of a secured connection with the Cloud, the Cloud Connectivity Service Module 190 notifies the Building Server 100 of the same (depicted by the arrow labeled 'OK').

Next, Building Server 100 proceeds to announce itself to the Cloud—via the Envision Deployment Engine (EDE) Module 711. It essentially invokes API exposed by the EDE Module 711 for this very purpose, and provides various pieces of information about itself (e.g. it's Building Server ID, and software and hardware versioning information).

This is represented by the arrow labeled Building Server Announce (Device Information) in FIG. 10A. In order to communicate this announcement to the Project Service Module 708, which is the module that communicates data from devices such as Building Server 100 System Application Modules such as System Project Application Module 140 and System Map Application Module 160, the Building Server's announcement has to first be propagated to the Envision Plugin Module 709 (Building Service Announce( )). In some embodiments, the Building Server Announcement from Building Server 100 is sent directly to the Envision Plugin Module 709 itself, rather than to the Envision Deployment Engine Module 711. Once the Building Server's announcement has reached the Cloud through the Envision Plugin Module 709, the Project Service Module 708 is notified, and it adds the Building Server to a list of known devices (Add Device to Discovery List ( )). Project Service Module 708 may do so by any known means, such as adding the Building Server's ID as well as other information (e.g. versioning information) to a database.

Once Building Server 100 is registered and connected, and the Project Service Module 708 is aware of its presence, a user (e.g. User C depicted in the figure) may access a system application module (Start App) while he/she is onsite using the front-end of the application presented on a mobile device such as a tablet computer. User C may be, for example, an Installer or Commissioning Engineer who has previously been granted the necessary access credentials to access one or more system applications, such as System Map Application Module 160. Exemplary system application modules were previously discussed in more detail in the context of FIGS. 1 and 6. User C, in various embodiments, then browses through the various projects he/she has access to, based on his/her role and credentials, and graphically selects the Project hierarchy and the Building associated with the site(s) he/she is physically at (Select Project (Building)). System Map Application Module 160 then fetches or requests (Get ( )) from Project Service Module 708, a previously created data model for the selected Building. In response, Project Service Module 708 provides a digital Floor Plan associated with the selected Building (Floor Plan ( )), which is thereafter displayed on the front-end of the System Map Application Module 160 executing on User C's mobile computing device (dotted arrow).

Next, User C indicates on the front-end of the System Map Application Module 160 that he/she wishes to localize a Building Server (Selection (Building Server)). This may be done by simply selecting an icon of a building server, and dragging it onto a visual representation of the building's floor plan. This user interaction with system application module indicates that it is time for User C to take a picture of the Building Server's unique, manufacturer provided QR code. Accordingly, the Application Module 160 activates the Camera device on User C's mobile computing device (Start Camera ( )), and requests the QR code from User C (Ask For QR Code( )). User C complies by taking a picture of the portion of the Building Server that contains the QR code. The QR code is used as an example here and is not meant to be limiting. Any unique code physically mounted or otherwise affixed on the Building Server may be used in other embodiments. The System Map Application Module 160 thereafter extracts the QR code from the image captured by the camera device on User C's mobile device (Return QR Code (ID)).

The remaining steps associated with this embodiment of localizing a Building Server is depicted in FIG. 10B. Once the System Map Application Module 160 has retrieved the QR code data from the image taken by the camera on User C's mobile device, Application Module 160 transmits the Building Server's ID along with the QR code data to the Project Service Module 708 (PUT <Building Server ID> (QR Data)). This may, in some embodiments, be accomplished via an HTTPS PUT method invocation. In response, the Project Service Module 708 searches for a device with the matching QR code data in an accessible Discovery List, and returns a profile of the identified device, e.g. "Discovered Device Profile" (Search for Device in Discovery List (QR Data, Discovered Device Profile)). Next, the Project Service Module 708 associates, in a memory, the physical device (e.g. Building Server whose QR code was captured in an image by User C) with a virtual device for localization onto the floor plan of the model of the Building in which the physical Building Server resides (Associate Physical To Virtual Device (Model, Discovered Device Profile)). The Project Service Module 708 thereafter returns an acknowledgement (dotted arrow) to the System Map Application Module 160.

Following receipt of the acknowledgement, Application Module 160 checks to determine whether or not the Building Server that User C is localizing is online or offline. Accordingly, it invokes the appropriate API call at the Project Service Module 708, and provides the requisite Building Server ID (Get Online Status (Building Server ID)). The Project Service Module 708 performs a lookup (e.g. in a database) using the supplied Building Server ID to retrieve the associated Discovered Device Profile (Lookup (Building Server ID, Discovered Device Profile)). Using the Discovered Device Profile, the Project Service Module 708 then invokes the Envision Plugin Module 709 with the appropriate ID of the Building Server and a request for online status (Get Online Status (BS ID)), which the Envision Plugin Module 709 can thereafter use to contact the correct Building Server to directly request online status information (Request Online Status( )). Building Server 100 then returns its online status (e.g. an indication of whether it is presently online or offline) (dotted arrow). This information is then propagated by the Envision Plugin Module 709 to the Project Service Module 708 via, for example, an invocation of the appropriate API call (Call Back Device Status (Online)). Based on the information received by the Project Service Module 708 (e.g. online or offline), the Project Service Module 708 informs the System Map Application Module 160 appropriately (alternate dotted arrows Online and Offline). If Building Server 100 is presently online (e.g. at the time User C is attempting to complete the localization process), then System Map Application Module 160 informs User C that the Building Server has been successfully localized (Show Successful Localization ( )). Alternatively, if Building Server 100 is presently determined to be offline, then the Project Service Module 708, in various embodiments, removes the previously created association between the Discovered Device Profile and the physical Building Server, and the System Map Application Module 160 informs User C that the Localization has failed (Show Localization Failure ( )). User C may be informed of the reason that the localization failed, for example, that Building Server 100 is offline and it is necessary for the Building Server to be online for localization to complete appropriately.

Gateway Localization

Figure 11:
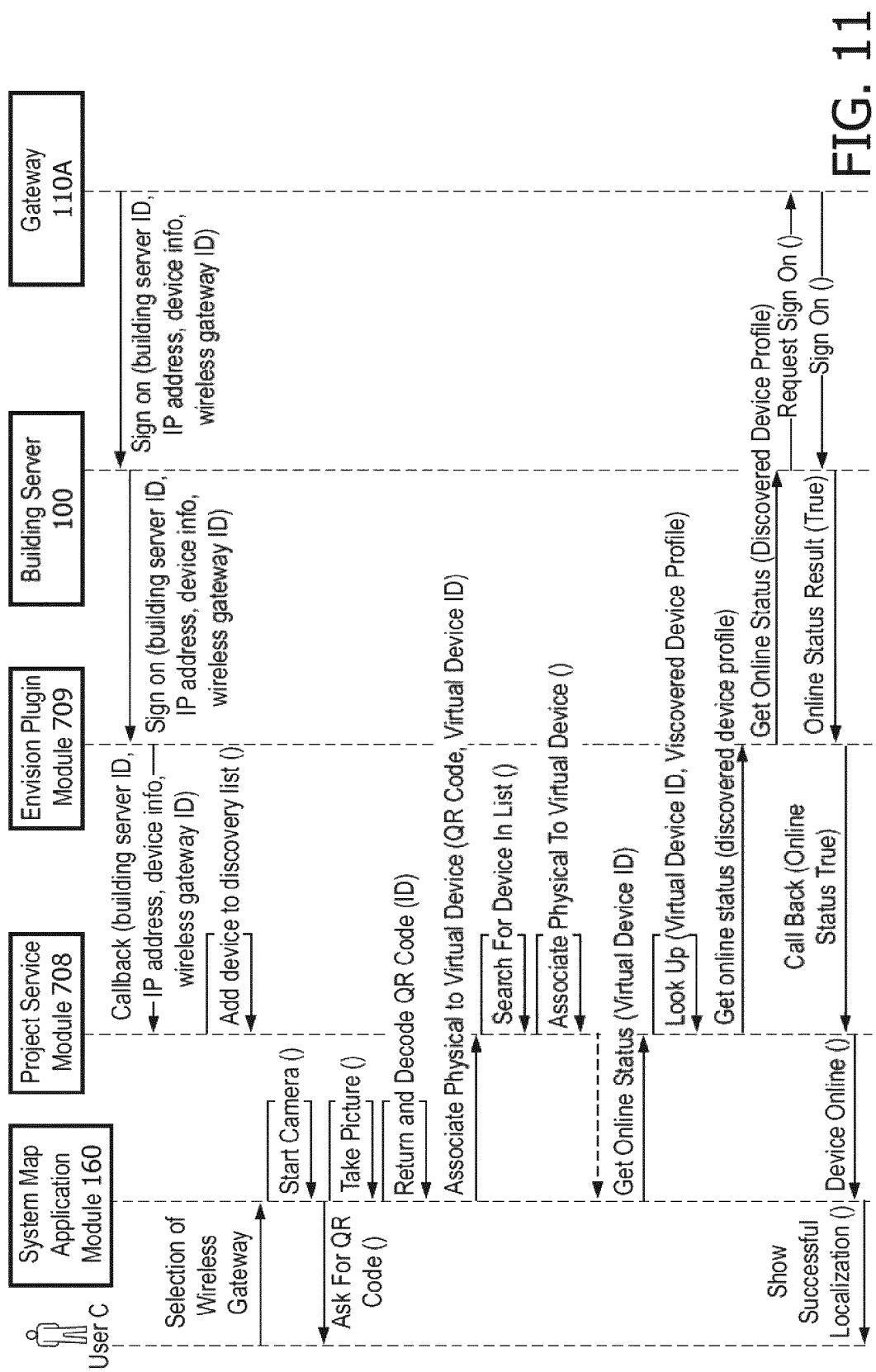
FIG. 11 illustrates an embodiment of a method of localizing a Gateway device at an exemplary cloud-based system for monitoring and controlling physical environments.
Figure 12A:
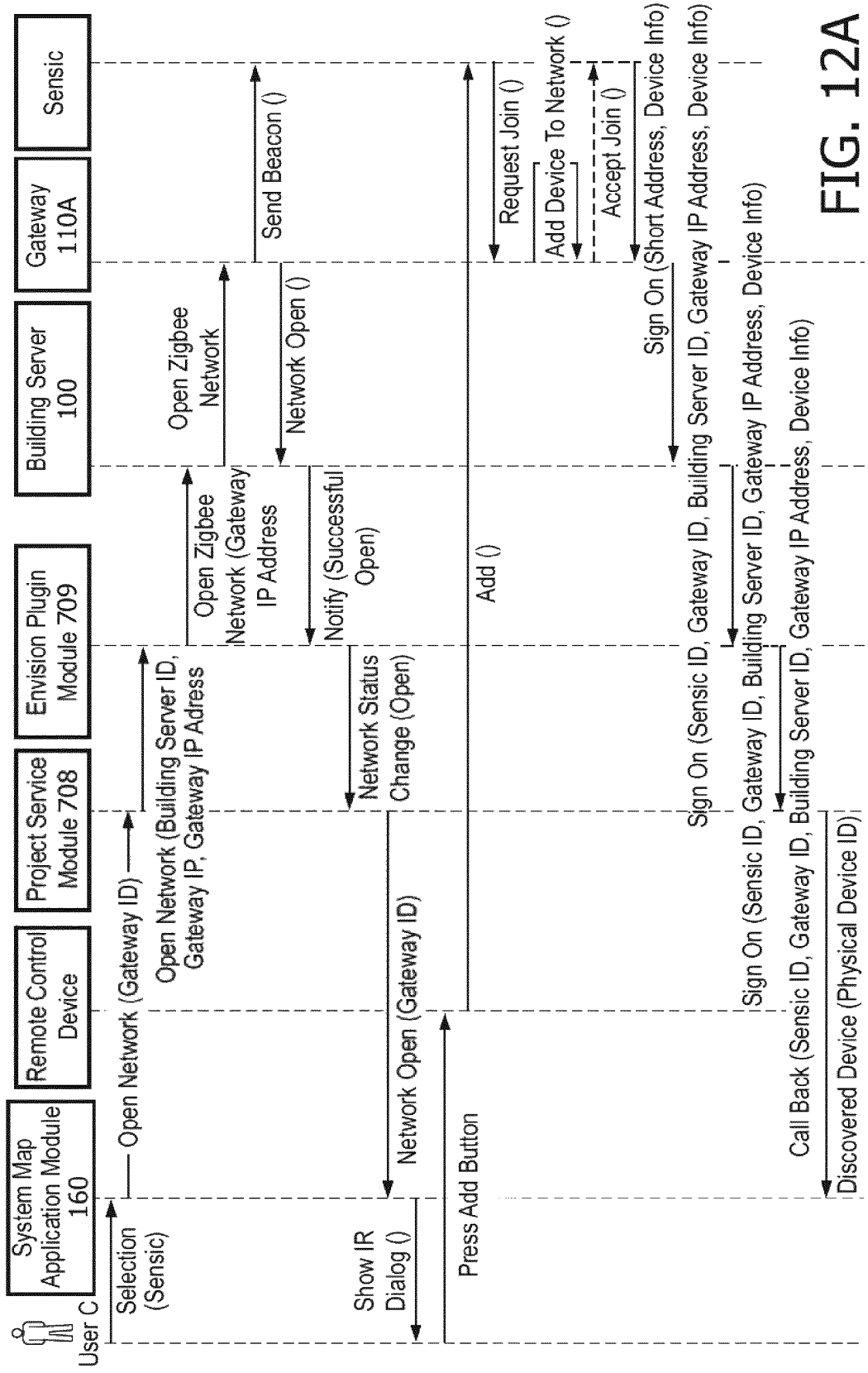

FIG. 11 illustrates an embodiment of a method of localizing a wireless Gateway (e.g. Gateway 110A of FIG. 1) at the exemplary cloud-based system for monitoring and controlling a physical environment. The boxes at the top of the figure represent a Building Server 100 inside a facility (e.g. similar to Building Server 100 of FIG. 1), and various cloud-based modules associated, for example, with Cloud 115 of FIG. 1. Envision Plugin Module 709, and Project Service Module 708 are embodiments of identically named cloud-based modules previously described in the context of FIG. 7A. Additionally, System Map Application Module 160 is a cloud-based application previously described in the context of FIGS. 1 and 6. User C, depicted on the left of FIG. 11 was also previously described in the context of FIG. 6. Essentially, User C is a person, such as an installer or commissioning engineer, who performs tasks such as physically and logically installing devices within a building based on a created digital model of a building, and thereafter participating in the commissioning, configuration, and/or deployment processes.

In some embodiments, the localization process for wireless Gateway 110A begins with the wireless Gateway sending a Sign On message via, for example, the MQTT protocol. The Sign On message, in many embodiments, contains the Building Server's unique ID, the IP Address of the wireless Gateway, information regarding the gateway, and an ID associated with the wireless Gateway (Sign On (Building Server ID, IP Address, Device Info, Wireless Gateway ID)). In various embodiments, the Building Server runs an MQTT proxy (e.g. as depicted in FIG. 7B), which then forwards the Sign On message to the Envision Plugin Module 709 (depicted as second arrow labeled Sign On (Building Server ID, IP Address, Device Info, Wireless Gateway ID)). The Envision Plugin Module 709, on its part, forwards the Sign On message and its associated parameters to the Project Service Module 708 running on Cloud 115. To do so, it may invoke a CallBack method or function that the Project Service Module 708 exposes as part of its API (CallBack (Building Server ID, IP Address, Device Info, Wireless Gateway ID)). The CallBack is a way of informing the Project Service Module 708 that a new device, yet to be localized, is attempting a sign on and is available. The Project Service Module 708 then adds the information regarding the wireless Gateway 110A received in the Call Back to its list of "new" devices it hadn't encountered previously (Add Device To Discovery List ( )).

Meanwhile, in this embodiment, User C graphically selects an icon representing wireless Gateway 110A on the user interface of the System Map Application Module 160 executing on a portable computing device such as a tablet computer (Selection of Wireless Gateway). This causes the System Map Application Module 160 to activate a camera application on the portable device (Start Camera ( )). The Map Application Module 160 may then prompt User C for a QR Code associated with the wireless Gateway (Ask For QR Code ( )). To comply, User C points the camera to a part of the wireless Gateway that has the QR Code on it, and takes a picture (Take Picture ( )). The image is then analyzed by the Map Application Module 160 and the QR Code is extracted (Return And Decode QR Code ( )).

Once the QR Code is extracted from the image, the Map Application Module 160 requests that the Project Service Module 708 associate the physical device associated with the QR Code with the Virtual Device represented in the Building's data model (e.g. on the digital floor plan of the Building) and represented on the Map Application Module 160's graphical user interface (Associate Physical To Virtual Device (QR Code, Virtual Device ID)). In many embodiments, in order to identify the physical device, the Map Application Module 160 supplies the QR Code and in order to identify the virtual device, it supplies a virtual device ID. In response, the Project Service Module 708 locates the virtual device in its list of discovered devices (Search For Device In List ( )), and thereafter associates, in a memory, the physical device (e.g. the wireless Gateway whose QR Code was captured in an image by User C) with the virtual device (e.g. the virtual device in its list matching the Virtual Device ID supplied by System Map Application Module 160) for localization purposes (Associate Physical To Virtual Device ( )). The Project Service Module 708 thereafter returns an acknowledgement to System Map Application Module 160 (depicted by the dotted arrow from Project Service Module 708 to System Map Application Module 160).

Following receipt of the acknowledgement of the association, System Map Application Module 160 requests the Online Status associated with the wireless Gateway. To allow the Project Service Module 708 to retrieve the status, it supplies the virtual device ID of the wireless Gateway (Get Online Status (Virtual Device ID)). The Project Service Module 708 thereafter retrieves a Discovered Device Profile based on the virtual device ID. In various embodiments, the profile includes the physical address of the device (in this example, the wireless Gateway) (LookUp (Virtual Device ID, Discovered Device Profile)). The Project Service Module 708 then forwards the request for the Online Status of the wireless Gateway to the Envision Plugin Module 709 (Get Online Status (Discovered Device Profile)), and this request is cascaded (Request Sign On ( )) to the appropriate Building Server (in this example, Building Server 100). In many embodiments, the physical address of the wireless gateway included in the Discovered Device Profile also identifies the address of the appropriate Building Server that is associated with the gateway in question. The Building Server 100 requests the wireless Gateway identified in the Discovered Device Profile to Sign On (Request Sign On ( )), and in response, the wireless Gateway signs on and indicates the same to the Building Server (Sign On ( )). The Building Server thereafter informs the Envision Plugin Module 709 that the wireless Gateway is online (Online Status Result (True)), and the Plugin, in turn, informs the Project Service Module 708 using, for example, its CallBack API (CallBack (Online Status True)). Lastly, the Project Service Module 708 informs the System Map Application Module 160 that the wireless Gateway is indeed online (Device Online( )), and the Map Application Module, in turn indicates successful localization to User C (Show Successful Localization ( )).

Localize System Devices such as Sensic Devices

FIGS. 12A, 12B-I, and 12B-II illustrate an embodiment of a method of localizing a System device, such as a Sensic device (e.g. a luminaire) at the exemplary cloud-based system for monitoring and controlling a physical environment. The boxes at the top of the figure represent a Building Server inside a facility (e.g. Building Server 100 of FIG. 1), a wireless Gateway (e.g. Gate 110A of FIG. 1), a Sensic Device (e.g. Device 101 of FIG. 1), an IR remote control device, and various cloud-based modules associated, for example, with Cloud 115 of FIG. 1. Envision Plugin Module 709 and Project Service Module 708 are embodiments of identically named cloud-based modules previously described in the context of FIG. 7A. Additionally, System Map Application Module 160 is a cloud-based application previously described in the context of FIGS. 1 and 6. User C, depicted on the top left of the figures was also previously described in the context of FIG. 6. Essentially, User C is a person, such as an installer or commissioning engineer, whose main task in this context may be to physically and logically install devices within a building based on a created digital model of a building. In many embodiments, User C thereafter participates in the commissioning, configuration, and deployment processes.

User C begins the localization process by selecting a Sensic device, such as a luminaire depicted on the digital floor plan of a building presented on the System Map Application Module 160 (Selection (Sensic)). As previously discussed, the front end of the Map module 160 may be executing on a tablet computing device. As, in many embodiments, the underlying data model used to populate the floorplan already has information on the wireless Gateway associated with the selected Sensic device, the Map module 160 requests that the Project Service Module 708 open the network associated with the particular wireless Gateway. To facilitate opening of the network, Map module 160 supplies the appropriate ID of the Gateway (Open Network (Gateway ID)). Upon receipt of this request, the Project Service Module 708 forwards a similar request to the Envision Plugin Module 709 after adding the associated Building Server's ID and the Gateway's IP Address (Open Network (Builder Server ID, Gateway ID, Gateway IP Address)). The Envision Plugin Module 709, in turn, requests that the particular Building Server identified by the supplied Building Server's ID open a ZigBee Network. To facilitate this, the plugin supplies the associated Gateway's IP Address (Open ZigBee Network (Gateway IP Address)). The Building Server (e.g. Building Server 100 in this example), in response, forwards a similar request to open its ZigBee network to the wireless Gateway identified by the Gateway IP Address (Open ZigBee Network ( )). The wireless Gateway (e.g. Gateway 110A in this example) opens its ZigBee network and informs all associated Sensic devices of the same (Send Beacon ( )). Wireless Gateway 110A also notifies Building Server 100 that the network has been successfully opened (Network Open ( )). Building Server 100, in turn, notifies the Envision Plugin Module 709 of the successful opening of the ZigBee network (Notify (Successful Open)). The Plugin Module 709, for its part, notifies the Project Service Module 708 that the status of the particular network has changed to an "Open" status (Network Status Change (Open)). The Project Service Module 709 thereafter notifies the System Map Application Module 160 that the Network Open request originally received from the application module has indeed been successfully completed, and the Network associated with the particular Gateway ID identified by the application module is in fact open (Network Open (Gateway ID)). In some embodiments, the System Map Application Module 160, on receipt of this information, displays its IR remote dialog on its GUI (Show IR Dialog ( )).

Once the IR remote dialog has been opened on the Map application module, User C is free to point the IR remote control device to the Sensic of interest and press a button to indicate that the Sensic should be added to the network of its wireless Gateway. In many embodiments, this button may be designated the "Add" button. The IR remote control device, receives this input and, in response, sends a signal to the Sensic device indicating that the Sensic device should add itself to its wireless Gateway's open network (Add ( )). Having received this instruction, the Sensic device sends the wireless Gateway 110A a request to join its network (Request Join( )), after which the wireless Gateway 110A adds the Sensic to its wireless network (Add Device To Network ( )), and informs the Sensic that its request to join the Gateway's network was accepted (Accept Join ( )). In many embodiments, if a Sensic joins the wireless Gateway's network, it picks a short address to identity itself. The Sensic then Signs On with the wireless Gateway 110A, providing its device information as well as its short address. The wireless Gateway 110A forwards the Sign On request to the Building Server 100 along with a Sensic ID associated with the Sensic, the wireless Gateway's own ID, the Building Server's ID, the Wireless Gateway's IP Address, and the Sensic's device information (Sign On (Sensic ID, Gateway ID, Building Server ID, Gateway IP Address, Device Info)). In various embodiments, wireless Gateway 110A may provide a subset of the above-identified information. Upon receipt, Building Server 100 forwards the same request to the Envision Plugin Module 709. The Plugin module invokes a CallBack method of the Project Service Module 708 with the same or similar parameters (CallBack (Sensic ID, Gateway ID, Building Server ID, Gateway IP Address, Device Info)), and the Project Service Module 708, in turn, informs the System Map Application Module 160 that a new device corresponding to the Sensic previously selected on the application by User C has been discovered. In many embodiments, the Project Service Module 708 also forwards to the Map Application Module 160, a unique physical device identifier as a parameter to a function call (Discovered Device (Physical Device ID)).

Thereafter, as depicted in FIGS. 12B-I and 12B-II, the Project Service Module 708 adds the Sensic device to a list of devices being managed by the Cloud (Add Physical Device To Device Manager List (Physical Device ID, Virtual Device ID)). As previously discussed in the context of localizing the Gateway and the Building Server, the physical device ID is typically a unique identifier associated with the physical device itself (e.g. a manufacturer-provided ID) and the virtual device ID is typically a unique identifier that may already be associated with a virtual representation (e.g. in a database) of the physical device. For example, a data model associated with the particular building housing the physical Sensic may have a virtual identifier to represent the physical Sensic even before the physical Sensic is actually localized or associated with its virtual representation.

Next, the Project Service Module 708 associates, in a memory such as a database, the physical device ID of the Sensic with its virtual device ID (Associate Physical To Virtual Device (Physical Device ID, Virtual Device ID)). In the meantime, the System Map Application Module 160 indicates (e.g. visually) to User C that the Sensic device has been successfully localized (Show Successful Localization ( )). User C can thereafter proceed to localize another Sensic device by, for example, selecting an icon representing the Sensic device on the digital floorplan displayed on the Map Application Module 160 (Selection (Sensic Device)). In various embodiments, even while the Cloud system is involved in localizing various Sensic devices in a building, deployment of the already-localized devices proceeds automatically, in parallel, and without any further assistance or intervention from User C.

The Project Service Module 708 typically begins the deployment process for a localized Sensic device (e.g. a luminaire) by invoking a method of its own with the virtual device ID of the Sensic device (Deploy (Virtual Device ID)). Thereafter, the Project Service Module sends a request to the Envision Plugin Module 709 to create a device configuration suitable for the Sensic device. In various embodiments, such a request includes the virtual device ID of the Sensic device, an indication of the area in which the device is located (e.g. hallway, meeting room, office, building floor), and one or more template fragments (in a human or machine readable format) indicating the behavior of the Sensic device under various circumstances (e.g. a change in occupancy, light or heat) (Create Device Configuration (Virtual Device ID, Area, Template Fragments)). The Envision Plugin Module 709, on receiving the request, simply forwards it to the Envision Deployment Engine Module 711 after performing any necessary translations between protocols. Upon receiving the request, the Envision Deployment Engine Module 711 creates a Target Configuration file that is readable by the Sensic device in question, using the received template fragments, area information, and virtual device ID (Create Device Configuration (Virtual Device ID, Area, Template Fragments)). Acknowledgements of successful creation are cascaded back to the Envision Plugin Module 709 and the Project Service Module 708 (depicted by dotted arrows labeled 'ACK').

Once the Project Service Module 708 has received acknowledgement of the successful creation of the Target Configuration, it sends a request to the Envision Plugin Module 709 to begin updating the Sensic device's configuration (Send Update Command (Virtual Device ID, Target Configuration)). In response, the Envision Plugin Module 709 forwards a similar request to Building Server 100 after performing any necessary protocol format translations. Building Server 100 then adds the Update request, along with the virtual device ID to an update queue that holds similar requests to update the configurations of various devices (Queue Command (Virtual Device ID)). This is due to the fact that User C can localize new devices while other localized devices are being configured. The configuration process, particularly the writing of the many configuration data blocks to the devices themselves, may be time consuming. Accordingly, in many embodiments, as requests to configure a recently localized device is received by Building Server 100, it is added to a queue and processed on a first-come-first-served basis. Assuming that the Sensic device at issue in this example is the first on to be added to the Queue, Building Server 100 notifies the Sensic device that it should now begin listening for commands from the Building Server (Listen To Me ( )). In response, the Sensic device sends an acknowledgement back to Building Server 100 (depicted by a dotted arrow labeled 'ACK').

Next, Building Server 100 sends a signal/message to the wireless Gateway 110A that it wishes to write a block of configuration data to a particular Sensic device identified by a virtual device ID (Write Configuration Block (Virtual Device ID, Configuration Block)). The Wireless Gateway forwards the message to the correct Sensic device identified by the virtual device ID. Upon receiving an acknowledgement from the Sensic device, it is cascaded back to Building Server 100 (depicted by the two dotted arrows labeled 'ACK'). Such a sequence is conducted repeatedly until all the blocks associated with the created Target Configuration file for the Sensic device have been written to the Sensic device. Once all the blocks have been written, Building Server 100 notifies the Envision Plugin Module 709 that the particular Sensic device's configuration update has been completed (Update Complete (Virtual Device ID)). This message is then cascaded to the Project Service Module 708, which records the fact that the particular Sensic device's configuration is now up-to-date. The Project Service may do so in a variety of ways, including updating a database accessible to the cloud based application modules to indicate the same (Device Config Uptodate ( )). Lastly, the Project Service sends a message to the System Map Application Module 160 indicating that configuration of the particular Sensic device is now complete (Update Complete (Virtual Device ID)).

Building Server 100, in the meantime, also sends a reset message to the Sensic device (Reset ( )), which causes the Sensic device to reboot itself. In many embodiments, upon successfully rebooting itself, the Sensic device sends a Sign On message to Building Server 100, along with its device information, and an indication that the device has a new configuration (Sign On (Device Info, New Configuration)).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing in the claims between parentheses are provided merely for convenience in line with European patent practice and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A computing cloud for monitoring physical environments comprising:
one or more data storage mediums that stores at least one of project data, diagnostic data and environmental metric data, wherein the one or more data storage mediums stores virtual representations of a plurality of system devices located at at least one site, wherein the plurality of system devices are assigned different levels denoting different distances from a gateway device for time synchronization of the plurality of system devices; and
at least one processor configured to implement a system project application configured to allow a user to graphically explore at least the project data which comprises at least one project hierarchy, and to control graphical access to one or more applications based on at least credentials assigned to the user, wherein, in the at least one project hierarchy, the at least one project hierarchy has an association with the at least one site, the at least one site has an association with at least one building, the at least one building has an association with at least one floor, and the at least one floor has an association with at least one system device,
wherein navigation, by the user, between said associations in said at least one project hierarchy is restricted based on the credentials assigned to the user, and
wherein the one or more applications is implemented by said at least one processor and comprises one or more of:
a system intake application configured to graphically facilitate creation and manipulation, by the user, of a virtual model of the at least one building, which is associated with the at least one project hierarchy;
a system map application configured to enable the user to perform commissioning, localization and/or deployment of one or more system devices; and
a system energy application configured to graphically depict data produced using data analytics, the data analytics being based on at least one of the diagnostic data and the environmental metric data.

2. The computing cloud of claim 1, further comprising:
a user management application, implemented by the at least one processor, configured to create user accounts for at least the user, and to assign one or more credentials to the user accounts, the one or more credentials comprising at least a role and login information.

3. The computing cloud of claim 2, further comprising:
a system login application, implemented by the at least one processor, configured to receive the credentials associated with a user account, and based on the received credentials, control access to the system project application.

4. The computing cloud of claim 2, wherein the login information of a user account comprises a username and a password, wherein the system project application allowing the user to graphically explore at least project data is based at least on the credentials assigned to the user, and wherein the system project application controlling graphical access to the one or more applications is based at least on the role, which is assigned to the user.

5. The computing cloud of claim 2, wherein the role is task-based and comprises at least one of: operational personnel, intake engineer, installer, commissioner, facilities personnel, finance personnel, sustainability personnel, and end user.

6. The computing cloud of claim 1, further comprising:
a system operations application, implemented by the at least one processor, configured to remotely manage indications of system errors, the system errors comprising one or more of:
errors in system device operation, errors in environmental metric data collection or analysis, and errors in commissioning, localization or deployment.

7. The computing cloud of claim 6, wherein the at least one building comprises any natural or constructed physical structure.

8. The computing cloud of claim 1, wherein the commissioning comprises associating, via a gateway and a building server, a given system device's unique identification information with a location of the given system device on a virtual model of a physical space, the physical space comprising the at least one floor.

9. The computing cloud of claim 1, wherein the localization comprises adding a given system device, based on unique identification information, of the given system device, comprising a physical device ID of the given system device, to a set of devices being managed by the computing cloud, and associating the physical device ID of the given system device with a virtual device ID associated with a virtual representation of the given system device in a memory.

10. The computing cloud of claim 1, wherein the deployment comprises applying configuration data to the one or more system devices, the configuration data being used to prescribe behavior of the one or more system devices in response to events comprising changes in ambient lighting, changes in occupancy, or passage of time.

11. The computing cloud of claim 1, wherein allowing, by the system project application, the user to graphically explore at least the project data comprises: restricting access by the user to one or more parts of the project hierarchy, the restricting being based on the system project application interacting with a system users application, wherein the system users application is configured to manage a given user's access rights to the project data based at least on credentials assigned to the given user.

12. The computing cloud of claim 1, wherein the manipulation of the virtual model comprises one or more of:
graphically associating floorplan data with a physical or virtual floor,
graphically associating one or more regions within a physical or virtual floor with one or more types of functional spaces,
graphically depicting system devices at one or more locations of a floor, and
associating configuration data with one or more regions of a floor or one or more system devices.

13. The computing cloud of claim 1, wherein the system project application allows the user to to graphically explore at least the project data comprising the at least one project hierarchy in a hierarchical manner, wherein the exploration begins at a high level in the at least one project hierarchy comprising one or more sites, and proceeds, based on the credentials assigned to the user, to lower levels in the at least one project hierarchy comprising one or more buildings within a site, one or more floors within a building, and one or more areas within a floor.

14. The computing cloud of claim 1, wherein the environmental metric data comprises data indicating usage of the one or more system devices, the one or more system devices comprising gateways, sensic devices, and building servers, and the diagnostic data comprises data indicative of functioning of the one or more system devices.

15. The computing cloud of claim 1, wherein at least part of the diagnostic data and/or the environmental metric data is received from the plurality of system devices with time stamps that are determined based on said assigned different levels.

16. A computing cloud for monitoring physical environments comprising:
one or more data storage mediums that stores at least one of project data, diagnostic data and environmental metric data, and stores virtual representations of a plurality of system devices that are located at a site which is remote from the computing cloud, wherein the plurality of system devices are assigned different levels denoting different distances from a gateway device for time synchronization of the plurality of system devices; and
at least one processor configured to implement a system project application configured to allow a user to graphically explore at least the project data which comprises at least one project hierarchy, and to control graphical access to, one or more applications based on at least credentials assigned to the user,
wherein the one or more applications is implemented by said at least one processor and comprises one or more of:
a system intake application configured to graphically facilitate creation and manipulation, by the user, of a virtual model of at least one building, which is associated with the at least one project hierarchy;
a system map application configured to enable the user to perform commissioning, localization and/or deployment of one or more system devices; and
a system energy application configured to graphically depict data produced using data analytics, the data analytics being based on at least one of the diagnostic data and the environmental metric data.

17. The computing cloud of claim 16, wherein at least part of the diagnostic data and/or the environmental metric data is received from the plurality of system devices with time stamps that are determined based on said assigned different levels.

* * * * *